(12) United States Patent
Scanlan et al.

(10) Patent No.: US 9,142,138 B2
(45) Date of Patent: Sep. 22, 2015

(54) DEVELOPMENT MONITORING SYSTEM

(75) Inventors: Laurel Scanlan, Burleigh Heads (AU); Michael Stancombe, Morningside (AU)

(73) Assignee: AHS Holdings Pty Ltd, Burleigh Heads (AU)

( * ) Notice: Subject to any disclaimer, the term of this patent is extended or adjusted under 35 U.S.C. 154(b) by 142 days.

(21) Appl. No.: 13/131,087

(22) PCT Filed: Dec. 10, 2009

(86) PCT No.: PCT/AU2009/001604
§ 371 (c)(1),
(2), (4) Date: Aug. 22, 2011

(87) PCT Pub. No.: WO2010/066003
PCT Pub. Date: Jun. 17, 2010

(65) Prior Publication Data
US 2011/0302202 A1    Dec. 8, 2011

(30) Foreign Application Priority Data

Dec. 10, 2008  (AU) ................................. 2008906381
Oct. 2, 2009   (AU) ................. PCT/AU2009/001318

(51) Int. Cl.
*G06F 17/30* (2006.01)
*G09B 7/00* (2006.01)

(52) U.S. Cl.
CPC ........................................ *G09B 7/00* (2013.01)

(58) Field of Classification Search
CPC ..... G06Q 50/20; G07F 17/32; G07F 17/3288; G07F 17/329; G07F 17/3293; G09B 5/00; G06F 3/048; G06F 3/04842; G06F 3/0482
See application file for complete search history.

(56) References Cited

U.S. PATENT DOCUMENTS

| 6,675,160 B2 | 1/2004 | Hara |
| 6,704,541 B1 | 3/2004 | Ciarallo |
| 6,898,590 B1 | 5/2005 | Streifer |

(Continued)

FOREIGN PATENT DOCUMENTS

| JP | 2001-014398 | 1/2001 |
| JP | 2002132126 | 5/2002 |

(Continued)

OTHER PUBLICATIONS

Shintani, "Advancement Record Adaptable to Children's Developmental Stage and Its Statistical Analysis", Mar. 7, 2006, Technical Report of the Institute of Electronics, Information, and Communication Engineers, vol. 105, No. 653, pp. 19-24.

*Primary Examiner* — Yuk Ting Choi
(74) *Attorney, Agent, or Firm* — Michael Haynes PLC; Michael N. Haynes

(57) ABSTRACT

A development monitoring system for monitoring the development of one or more subjects includes an administrative module. A client module and the administrative modules are configured to communicate with each other. The administrative module is configured to generate an interface and send the interface to the client module for rendering such that the interface permits the input of at least one of observation data and program data. The data input is written to a database. At least one of the observation data and the program data are retrieved from the database on receipt of a request from the client machine and a visual record representing said observation and image data is generated.

7 Claims, 38 Drawing Sheets

(56) References Cited

U.S. PATENT DOCUMENTS

| | | |
|---|---|---|
| 2002/0078067 A1 | 6/2002 | Collins |
| 2002/0168621 A1* | 11/2002 | Cook et al. .................... 434/350 |
| 2003/0061328 A1* | 3/2003 | Abdelhadi et al. ............ 709/223 |
| 2003/0134261 A1 | 7/2003 | Jennen |
| 2003/0180703 A1* | 9/2003 | Yates et al. .................... 434/353 |
| 2010/0047757 A1* | 2/2010 | McCurry et al. .............. 434/353 |

FOREIGN PATENT DOCUMENTS

| | | |
|---|---|---|
| JP | 200279019 | 9/2002 |
| JP | 2003-341259 | 12/2003 |
| JP | 2004-100270 | 4/2004 |
| JP | 2004157616 | 6/2004 |
| JP | 2006-339794 | 12/2006 |
| JP | 2007180709 | 7/2007 |
| WO | WO01/88879 | 11/2001 |

\* cited by examiner

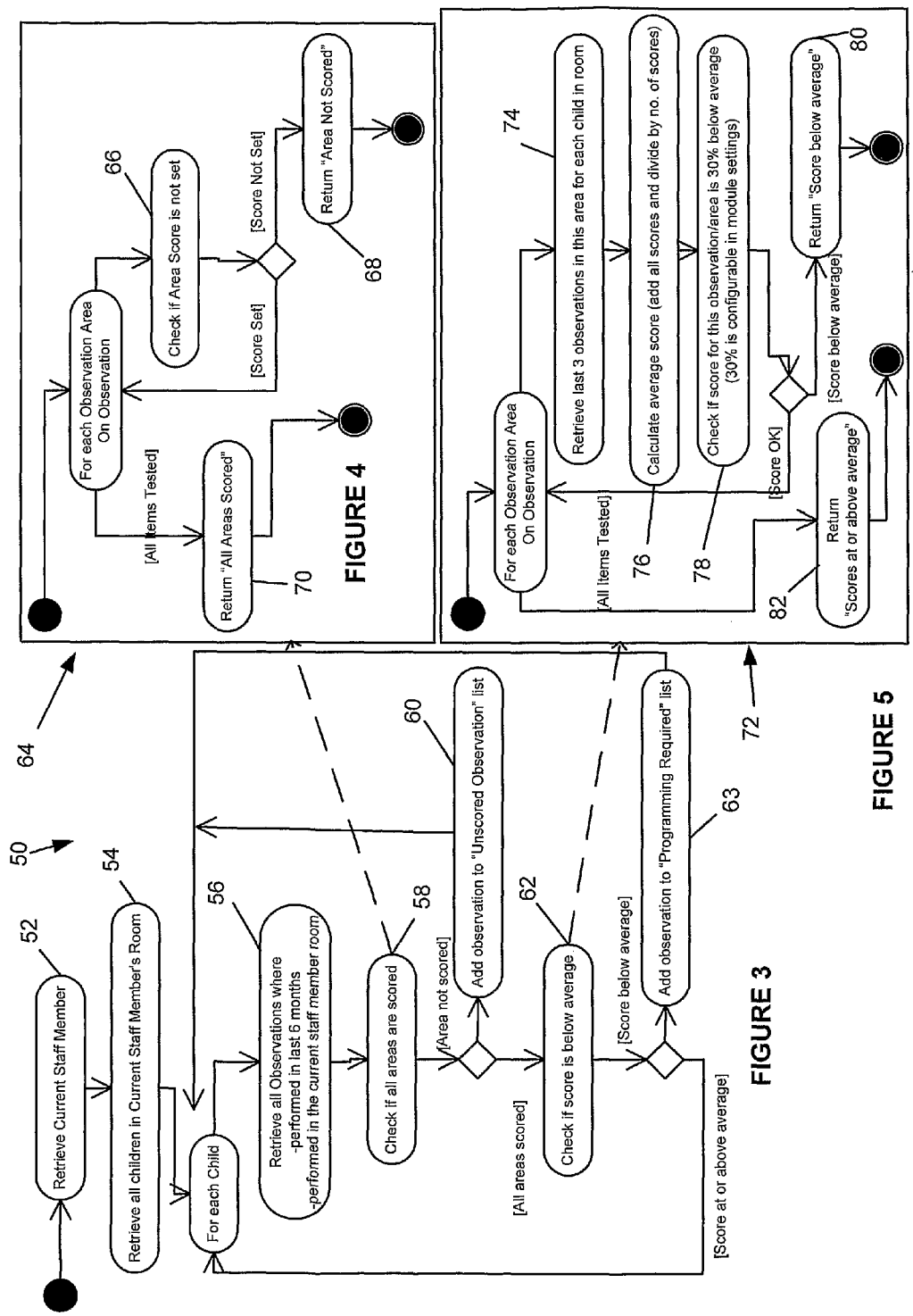

| Home | CELS | Maintenance | Staff | Parents |

First Name  XXXXXXX

Last Name  XXXXXXX

Date of Birth  XXXXXXX

Current Room  XXXXXXX

Attendance Days  XXXXXXX

Parent User Account  XXXXXXX

Is active? ☐

Update  Delete  Cancel

Figure 16

| Home | CELS | Maintenance | Staff | Parents |

Name [        ]

Is Scored? [✓]

Update    Delete    Cancel

- 1) Sense of Self
  - A) Expressing initiative
    1) Child turns towards or away from a person or object.
    2) Child initiates or avoids contact with a person or object.
    3) Child moves with persistence until reaching a chosen person or object
    4) Child says "No!"
    5) Child expresses a choice or intention in words
    New Level
  + Distinguishing self from others
  + Solving Problems
  + Developing self-help skills
  New Sub Category
+ 2) Social Relations
+ 3) Creative Representation
+ 4) Movement
+ 5) Communication and language
+ 6) Exploration and Early Logic
New Category Score: 1
Name: Child turns toward or away from a person or object.
Description: [            ]

Update    Delete    Cancel

Figure 21

| Home | CELS | Maintenance | Staff | Parents |
|---|---|---|---|---|

Programming

Site  XXXXXX

Room  XXXXXX

Child/Group  XXXXXX

Date Range  XXXXXX

Apply Date Range

Programs

+ Create New

| Date Range | Child/Group | Evaluation | Follow Up |
|---|---|---|---|
| 🔍 X XXXXXX | XXXXXX | XXXXXX | |
| 🔍 X XXXXXX | XXXXXX | XXXXXX | |
| 🔍 X XXXXXX | XXXXXX | XXXXXX | |

Figure 23

| Home | CELS | Maintenance | Staff | Parents |

Date

Child/Group   Group Monthly Plan ▶

Teacher ▶

| | Category | Sub Category |
|---|---|---|
| 🖉 X | Initiative | A) Making choices and plans |
| 🖉 X | Initiative | C) Initiating play |
| 🖉 X | Initiative | D) Taking care of personal needs |
| 🖉 X | Social Relations | F) Relating to other children |
| 🖉 X | Social Relations | G) Resolving interpersonal conflict |
| 🖉 X | Social Relations | H) Understanding and expressing feelings |
| 🖉 X | Movement and Music | N) Feeling and expressing steady beat |
| 🖉 X | Movement and Music | P) Singing |
| 🖉 X | Language and Literacy | T) Showing awareness of sounds in words |
| 🖉 X | Language and Literacy | V) Using letter names and sounds |
| 🖉 X | Mathematics and Science | CC) Identifying position and direction |
| 🖉 X | Mathematics and Science | EE) Identifying materials and properties |

Add Area

Objective — 357 xxxxxxx

Resources

Add Resource

Figure 24

| Home | CELS | Maintenance | Staff | Parents |

Date    xxxxxxx

Teacher    xxxxxxx ▶

Where    xxxxxxx ▶

When    xxxxxxx ▶

Add to diary ☐

Add Areas

| Child
X | xxxxxxx

Anecdote

Add Image
xxxxxxx

Update    Cancel

Figure 28

| Home | CELS | Maintenance | Staff | Parents |

Date xxxxxxx

Teacher xxxxxxx ▶

Where xxxxxxx ▶

When xxxxxxx ▶

Add to diary ☐

| Area | |
|---|---|
| x | Initiative<br>B) Solving problems with materials |
| x | Initiative<br>C) Solving problems with materials |
| x | Social Relations<br>F) Relating to other children |
| x | Social Relations<br>H) Understanding and expressing feelings |

Add Areas

← 405

| | Child |
|---|---|
| x | xxxxxxx |

Add Children

Figure 29

Anecdote

Set Score

| Do not add area to observation |
| Leave score empty |
| 1) Child expresses frustration when encountering a problem with materials |
| 2) Child identifies a problem with materials and asks for help |
| 3) Child tries one way to solve a problem with materials |
| 4) Child tries two ways to solve a problem with materials |
| 5) Child tries three or more ways to solve a problem with materials |

← 407

Name
Girl
Age

403 →

| Initiative |
| B) Solving problems with materials |
| Initiative |
| C) Initiating play |
| Social Relations |
| F) Relating to other children |
| Social Relations |
| B) Understanding and expressing feelings |

Update  Cancel

Figure 30

| Home | CELS | Maintenance | Staff | Parents |
|------|------|-------------|-------|---------|

Child      xxxxxxx
Date       xxxxxxx
Teacher    xxxxxxx ▶
Where      xxxxxxx ▶
When       xxxxxxx ▶

| | Area | |
|---|---|---|
| x | Language & Literacy<br>V) Using letter names and sounds | 2) Child names three or more alphabetic letters ▶ |
| x | Language & Literacy<br>W) Reading | 3) Child calls attention to print ▶ |
| x | Language & Literacy<br>T) Showing awareness of sounds in words | 3) Child rhymes one word with another ▶ |
| x | Language & Literacy<br>S) Using complex patterns of speech | 4) Child uses a compound subject or object ▶ |

Add Areas

Anecdote     xxxxxxx

Remove Image

Update   Delete   Cancel

Figure 32

MASTER RECORD

Preschool

| PERIOD | Age | Initiative | | | Social Relations | | | | Creative Representation | | | Movement and Music | | | Language and Literacy | | | | | | | | Mathematics and Science | | | | | | | |
|---|---|---|---|---|---|---|---|---|---|---|---|---|---|---|---|---|---|---|---|---|---|---|---|---|---|---|---|---|---|---|
| | | A | B | C | D | E | F | G | H | I | J | K | L | M | N | O | P | Q | R | S | T | U | V | W | X | Y | Z | AA | BB | CC | DD | EE | FF |
| Child Name | | | | | | | | | | | | | | | | | | | | | | | | | | | | | | | | | |
| XXXX | XXX | 2 | | 5 | | 4 | 5 | | | | 5 | 5 | 5 | 5 | | 5 | 3 | 3 | | 5 | | 3 | 5 | | 5 | | | | 5 | | 5 | 5 | | 2 |
| XXXX | XXX | 2 | 3 | 3 | | 4 | 3 | | 4 | 4 | 3 | 4 | | | 5 | 4 | 4 | 4 | 4 | | 4 | 4 | 4 | | 2 | 4 | 3 | | 5 | 4 | 5 | 3 | 5 |
| XXXX | XXX | 2 | | 3 | | 4 | 3 | | | 4 | 5 | 2 | | 5 | | 5 | | | 5 | 3 | | | 5 | 5 | | | 5 | 3 | 3 | 2 | | 2 | |

444 → PERIOD
446 → Social Relations
447 → FF
442 → XXXX (Child Name)

DEVELOPMENT MONITORING SYSTEM

FIELD OF THE INVENTION

This invention relates to a development monitoring system and to a method for monitoring the development of one or more subjects.

BACKGROUND OF THE INVENTION

It is generally accepted that one of the difficulties associated with monitoring the development of subjects, such as children or groups of children is to ensure that sufficient information is available to make accurate assessments of the progress of such subjects.

At present, the mariner in which this is done varies from making entries in notebooks and physically compiling daily or weekly reports manually which can then be given to parents or other parties of interest to generate periodical progress reports. In the case of children, such as at educational centre, the daily or weekly reports are usually generated manually by a teacher or other staff member. The reports are often prepared outside of the classroom and, in some cases, away from the educational centre. In itself, this is a problem because the accuracy of the reports relies on the recollection of the relevant teacher. Furthermore, the content of the reports can be slanted or biased depending on the mindset of a particular teacher.

The fact that teachers are often forced to prepare the reports outside of school hours can also place an unwelcome burden on those teachers. This can result in the danger of certain teachers being less than diligent in preparing their reports. As a result, the developmental progress of a child or group of children can be adversely affected.

Another problem associated with the system that is presently used is that it is very difficult to detect some sort of pattern of results associated with the reports. It follows that the slant or bias of a particular teacher is often not detected. This can be problematic because teachers at an educational centre are usually from varying training backgrounds and have different attitudes towards behavioural traits displayed by children. Thus, the manner in which a child's development progresses and is reported relies heavily on such an attitude.

Another disadvantage associated with the systems at present is that they do not provide reports which can be assessed in a very short time. In order to assess a child's development, it would be necessary to physically collate a large number of documents, arrange them in time order and attempt to detect some form of pattern resulting from the documents. That may work, to some extent, but it will be appreciated that attempting to do that in the context of a number of other children would be extremely difficult.

Uniformity of language is an important issue when attempting to generate consistent reports for a number of subjects at a particular centre. For example, a statement of a developmental trait can often be associated with a number of different meanings. As a result, one teacher may use a statement which is not necessarily the same statement that would be used by another teacher in attempting to explain the same developmental trait. It is clear that this can result in reports that are excessively subjective. For example, one developmental statement can have a number of different meanings for parents and teachers. As a result, a misunderstanding can easily arise between a parent and teacher regarding the level of development reached by a particular child.

Key to the disadvantages listed above is the fact that proper collection of information and identification and organisation of that information is not presently achieved.

SUMMARY OF THE INVENTION

According to a first aspect of the invention, there is provided a development monitoring system for monitoring the development of one or more subjects, the system comprising
  an administrative module;
  a client module, the administrative and client modules being configured to communicate with each other; wherein
  the administrative module is configured to carry out the following steps;
  generating an interface and sending the interface to the client module for rendering such that the interface permits the input of at least one of observation data and program data;
  writing the data input to a database;
  retrieving at least one of the observation data and the program data from the database on receipt of a request from the client machine; and
  generating a visual record representing said at least one of observation data and program data.

The server machine may be configured to generate the interface such that the user is capable of entering data relating to developmental areas, developmental components of respective areas and scores associated with respective developmental components for at least one of a group of subjects and an individual subject.

The administrative module may be configured such that the interface is a common interface configured for entering various levels and types of data without the need to navigate to and from other interfaces.

The administrative module may be configured to generate the interface such that the data input is written to the database in association with a timestamp corresponding to a time at which an observation relating to the data input was made.

Each score may have a numerical value and the administrative module may be configured to process a series of scores related to respective learning components to produce a result.

The administrative module may be configured to associate each numerical value with a predetermined colour, the administrative module being further configured so that the visual display displays colours such that a user can determine a learning development trend by perceiving change in colour over time and across developmental components.

The administrative module may be configured such that the visual display displays the developmental areas, developmental components of those respective areas together with respective subjects such that each score can be associated with a particular subject and learning component in respect of which the subject is scored.

The administrative module may be configured such that the visual display is in a tabular format with information relating to developmental areas and associated developmental components on one axis and information relating to subjects on the other axis with allocated scores and associated colours being displayed in cells representing the coincidence of a subject and an associated developmental component.

The administrative module may be configured such that each cell provides a navigational link to the interface.

The administrative module may be provided by a server machine capable of communicating with a network, the client module being provided by a client machine also capable of communicating with a network, such that the server and client machines are capable of communicating with each other.

server module is defined by a server machine capable of communicating with a network, the client module being defined by a client machine also capable of communicating with a network, such that the server and client machines are capable of communicating with each other.

According to a second aspect of the invention, there is provided a method of monitoring the development of a subject or group of subjects, the method including the steps of:

generating an interface and sending the interface to a client module for rendering such that the interface permits the input of at least one of observation data and program data;

writing the data input to a database;

retrieving at least one of the observation data and the program data from the database on receipt of a request from the client module; and generating a visual record representing at least one of the observation and program data.

The method may include the step of generating the interface such that the user is capable of entering data relating to developmental areas, developmental components of respective areas and scores associated with respective developmental components for at least one of a group of subjects and an individual subject.

The method may include the step of generating the interface such that the interface is a common interface configured for entering various levels and types of data without the need to navigate to and from other interfaces.

The data input may be written to the database in association with a timestamp corresponding to a time at which an observation relating to the data input was made.

Each score may have a numerical value and the method may include processing a series of scores related to respective learning components to produce a result.

The method may include associating each numerical value with a predetermined colour, so that the visual display displays colours allowing a user to determine a learning development trend or trait by perceiving changes in colour over time and across learning components.

The visual display may be generated to display the developmental areas, developmental components of those respective areas together with respective subjects such that each score can be associated with a particular subject and learning component in respect of which the subject is scored.

The visual display may be generated to be in a tabular format with information relating to developmental areas and associated developmental components on one axis and information relating to subjects on the other axis with allocated scores and associated colours being displayed in cells representing the coincidence of a subject and an associated developmental component.

The visual display may be generated such that each cell is configured to provide a navigational link to the interface.

server module is defined by a server machine capable of communicating with a network, the client module being defined by a client machine also capable of communicating with a network, such that the server and client machines are capable of communicating with each other.

According to a third aspect of the invention, there is provided a device capable of storing a set of instructions to be read by a data processing machine, the device configured to store a set of instructions such that, when the instructions are read by a data processing machine, the data processing machine carries out the following steps:

generating an interface and sending the interface to a client module for rendering such that the interface permits the input of at least one of observation data and program data;

writing the data input to a database;

retrieving at least one of the observation data and the program data from the database on receipt of a request from the client module; and generating a visual record representing at least one of the observation and program data.

According to a fourth aspect of the invention, there is provided a software product capable of execution by a data processing machine, the software product containing instructions which, when executed by the data processing machine, causes the data processing machine to carry out the following steps:

generating an interface and sending the interface to a client module for rendering such that the interface permits the input of at least one of observation data and program data;

writing the data input to a database;

retrieving at least one of the observation data and the program data from the database on receipt of a request from the client module; and generating a visual record representing at least one of the observation and program data.

The invention is now described, by way of example, with reference to the accompanying drawings. The following description is illustrative only and is not intended to limit the scope of the preceding paragraphs or the appended claims in any manner.

BRIEF DESCRIPTION OF THE DRAWINGS

FIG. 3 indicates a flowchart of activities or steps carried out for scoring developmental levels of subjects with respect to particular learning components.

FIG. 4 indicates a flowchart of steps carried out for determining the level of scoring activity in relation to particular learning areas or learning components.

FIG. 5 indicates a flowchart of steps carried out for determining an average score in respect of a particular learning area or component over a predetermined number of observations.

FIG. 16 is a screen dump of a web form used for administering a particular child.

FIG. 21 is a screen dump of a lower level web form used for adding or editing curriculum details.

FIG. 23 is a screen dump of a top-level web form used for adding a development program or editing, deleting or viewing an existing development program.

FIG. 24 is a screen dump of a first part of a second level web form used for editing, deleting or adding a teaming area to a development program.

FIG. 28 is a screen dump of a web form used for entering observation data into database tables.

FIG. 29 is a first part of a low level form used for entering the observation data into the database tables.

FIG. 30 is a second part of the form in FIG. 29 and includes fields for entering score values associated with respective learning components and children or groups into the database tables.

FIG. 32 is a screen dump of a web form used for editing a particular observation.

DETAILED DESCRIPTION OF THE DRAWINGS

Figure 1:
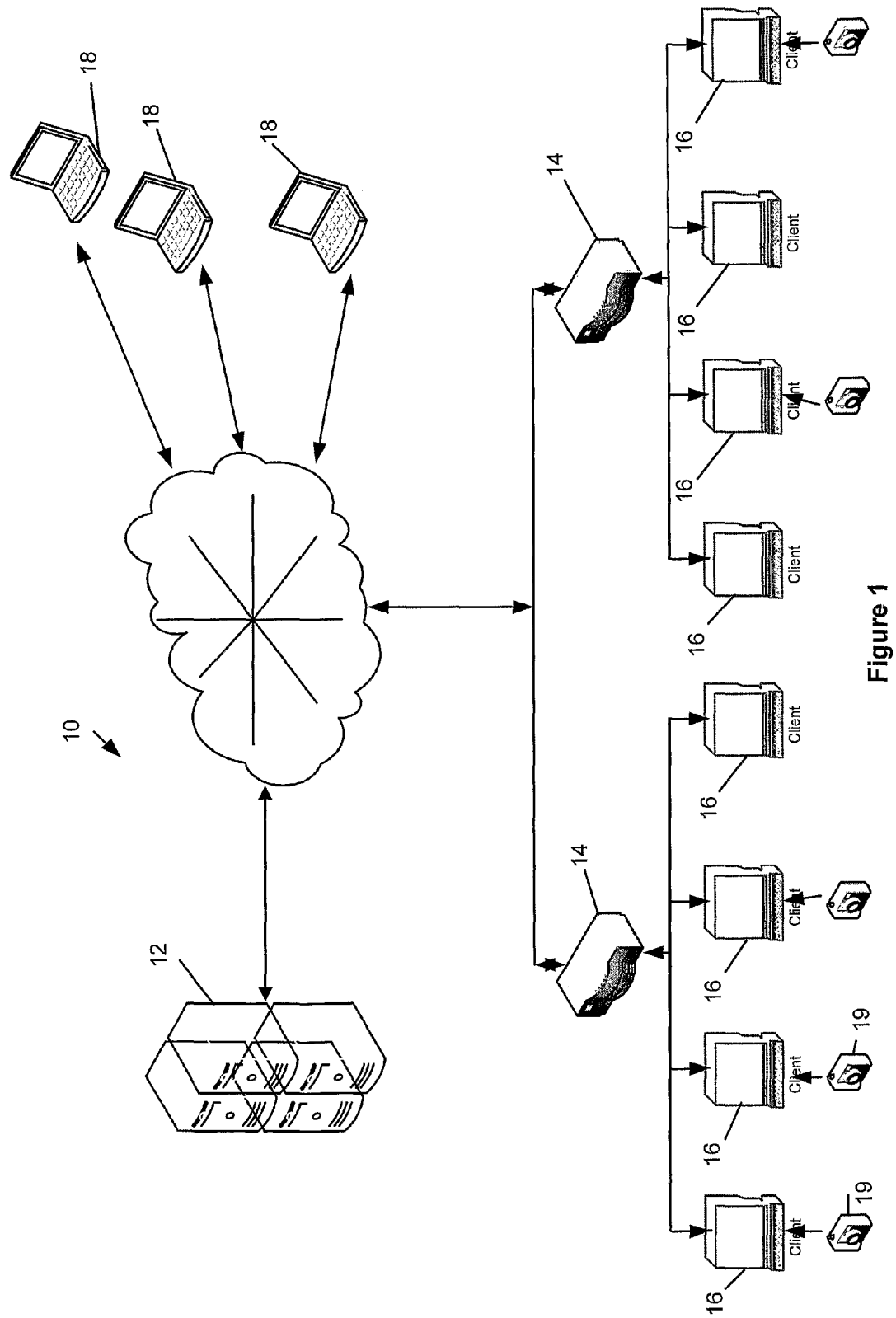
FIG. 1 shows one embodiment of a system, in accordance with the invention, for monitoring the development of a subject.

In FIG. 1, reference number 10 generally indicates a system, in accordance with the invention, for monitoring the development of a subject. In this particular example, the subject is a child and the system 10 is used in a childcare centre. It will readily be appreciated that the system can be used in any other environment where it may be found necessary to monitor the development of humans or even animals in that environment. Accordingly, the fact that the following example is described with reference to a childcare centre should not be regarded as limiting the scope of the claims in any way.

In this specification, the words "developmental" and "learning" are used interchangeably to ensure an understanding that "learning" is not to be regarded as being limited to academic learning but also to other aspects of the subject's or child development.

The system 10 includes a server machine or server 12 capable of communicating with a network, in this case, the Internet 12. It will readily be appreciated that the server 12 can comprise one or more machines acting together to define the server 12, depending on the size of the particular centre where the server is being implemented.

The system 10 includes a number of routers 14. Each router is positioned at a respective childcare centre which contains a number of client machines 16, for example. Each client machine 16, can be in the form of a desktop computer, laptop, PDA or any other device capable of accessing the Internet. It will readily be appreciated that the network shown in FIG. 1 can achieve the same functionality with a different configuration. For example, each of the client machines 16 can communicate directly with the Internet and thus with the server 12.

Each client machine 16 is shown associated with a recording device 19. In this particular example, the recording device is a digital camera. However, it will be appreciated that the recording device 19 can be in the form of any device capable of storing a digital signal for subsequent upload to the server 12.

The system 10 is configured to provide portals to subscribers 18. In this example, the subscribers 18 could be parents or other carers of children attending the centre. However, the subscribers could be any other class of person, for example where the centre is a medical centre; the subscribers could be medical professionals such as doctors and nurses.

Figure 2:
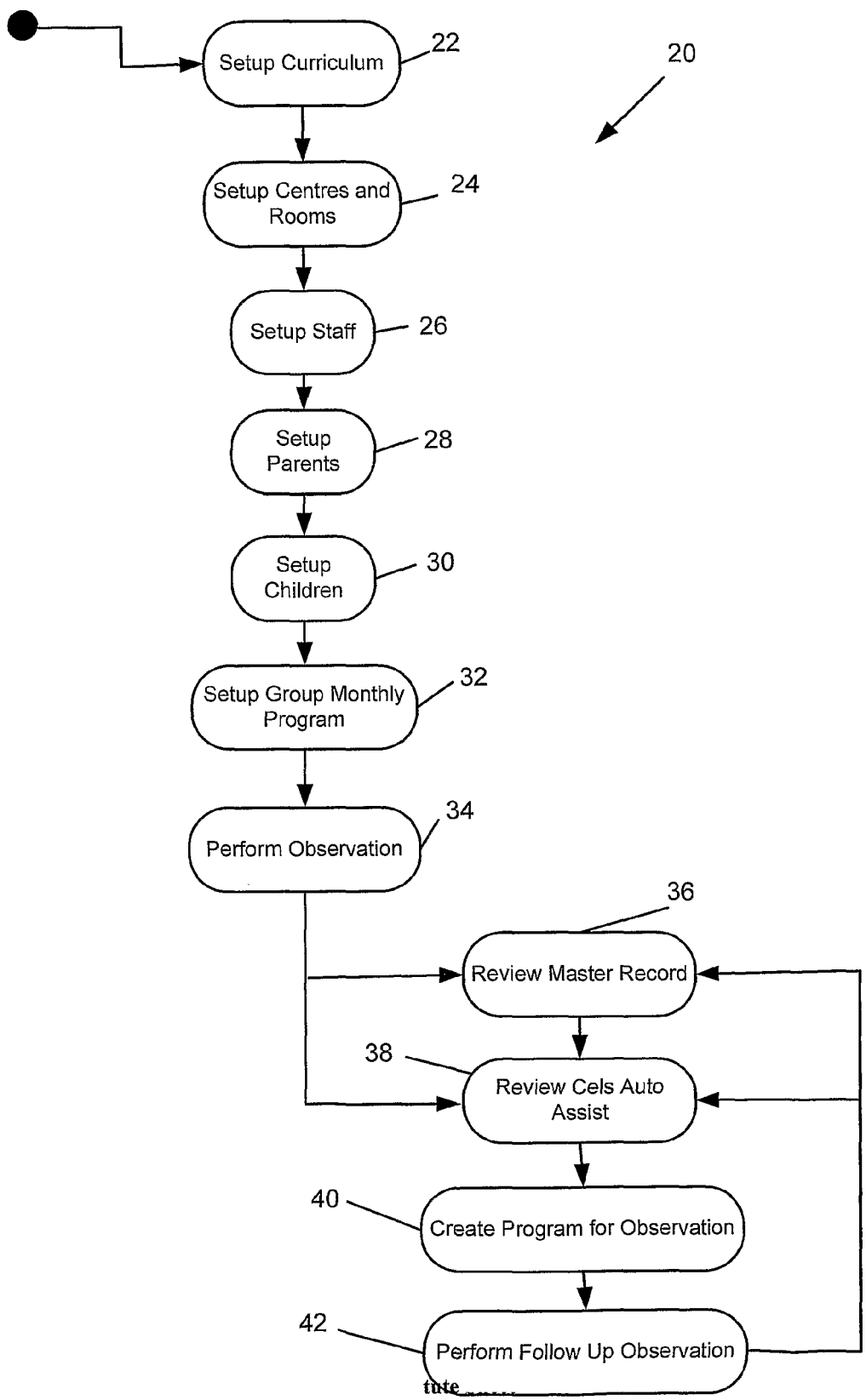
FIG. 2 indicates a flowchart of activities required for using the system of FIG. 1, in accordance with one embodiment of a method also in accordance with the invention.

In FIG. 2, reference 20 generally indicates a high level flowchart of various activities carried out in order to implement a method for monitoring the development of a subject, in accordance with the invention, using the system of FIG. 1.

At 22, a curriculum to be used by the centre is set up. Details of how the curriculum is set up are explained further below. At 24, the centre or centres using the system 10 are set up. That includes setting up staff details at 26, parent details at 28, details of children at 30. A monthly program is set up at 32. Observations are performed at 34. Then, the master record can be reviewed at 36 or scoring protocols can be reviewed at 38. Programs can be created for observations at 40. Various follow-up actions on the observations can be performed at 42 prior to again reviewing the master record or the scoring protocols.

In FIG. 3, reference number 50 generally indicates a high level flowchart for scoring components of learning areas.

Details of a current staff member associated with a particular program are retrieved at 52. Details of all the children in a room attended by that staff member are retrieved at 54. For each child, data representing all the observations performed in a previous predetermined period by that staff member in that particular room is retrieved at 56. A check is run at 58 to investigate whether or not all the areas have been scored. If a particular area is not scored, the underscored observation is added to a list at 60.

At 62 a check is run to investigate whether or not particular scores are below average. If the result is at or above average, the previous steps are repeated. If the result is below average, the associated observations are added to a list at 63 representing learning areas or components requiring further programming.

In FIG. 4, reference number 64 generally indicates a lower level flowchart for the step shown at 60 in FIG. 3. For each observation area, a check is run at 66 to investigate whether or not a score has been set. If a score has been set, the check is repeated. If a score has not been set, a value representing an area not scored is retained at 68. When all the areas have been checked, a value representing all areas scored is retained at 70.

In FIG. 5, reference number 72 generally indicates a lower level flowchart indicating the step at 62 in FIG. 3.

For each observation, details of a number of previous observations in a particular learning area for each child in a particular room are retrieved at 74. An average score over the period of those observations is calculated at 76. At 78, a check is run to investigate whether or not the result of that calculation is a predetermined percentage below an average. If the result is a below average score a value representing the below average score is retained at 80. Otherwise, the previous steps are repeated until all the observations are tested. Then a value representing the number of scores at or above average is retained at 82.

The flowcharts in FIGS. 3 to 5 indicate a manner in which the system is able to monitor both the performance of a child and a teacher or carer. The data generated by carrying out the steps shown in the flowcharts can be written to database tables and subsequently retrieved using appropriate queries to generate records of performance.

It will be appreciated that any number of algorithmic operations can be carried out on scores generated by the system 10. For example, the server 12 can be configured to record a series of scores related to a particular child and to generate an alert if the scores indicate an undesirable characteristic over a predetermined, consecutive number of recordals. Furthermore, for example, a series of scores are consistently high with a certain staff member and subsequently low with a replacement staff member or another staff member in the same centre can trigger an alert as to the performance or attitude of that particular staff member.

Figure 6:
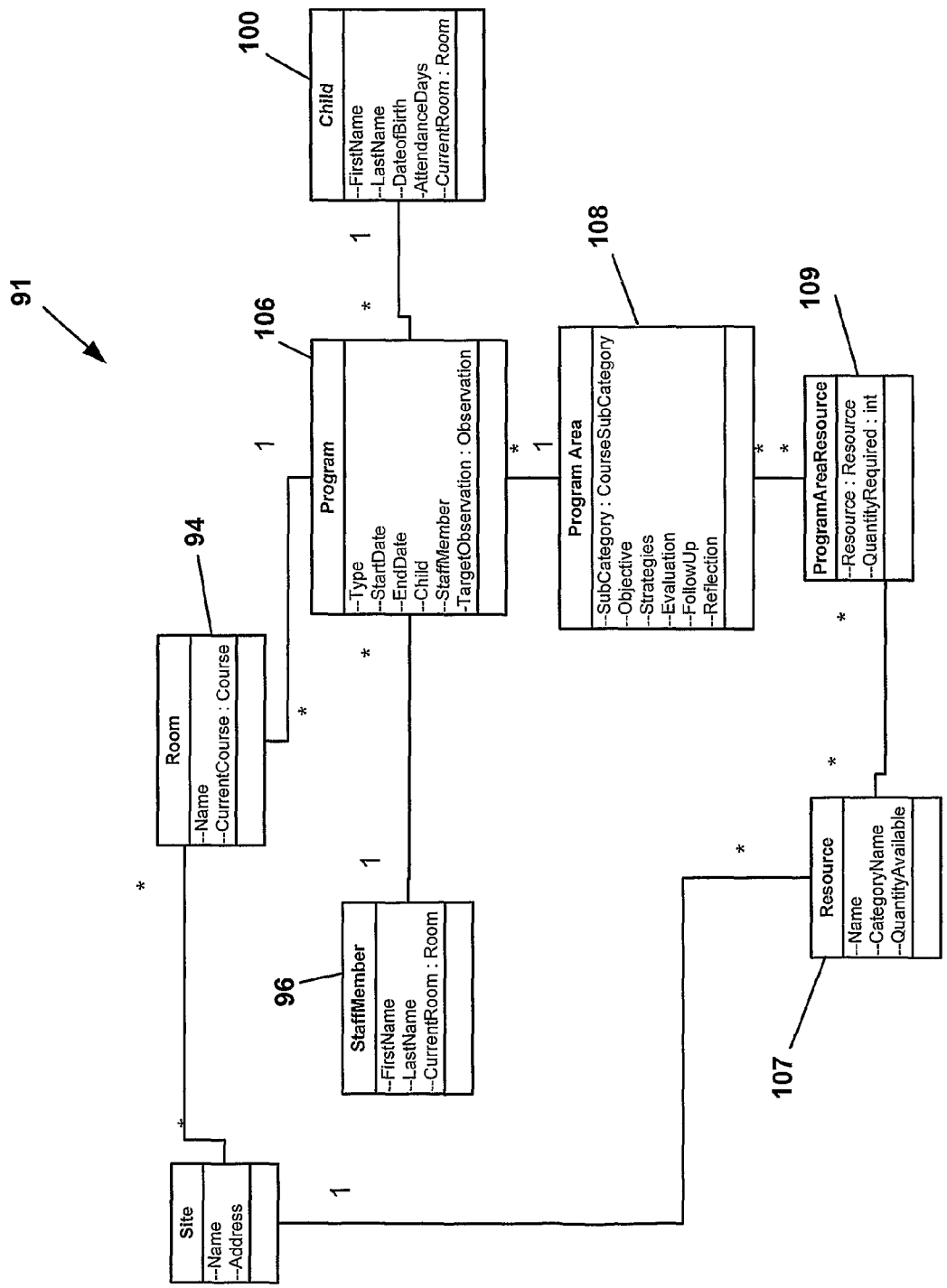
FIG. 6 is an upper level class diagram of the classes and attributes of various data components of the system of FIG. 1.

In FIG. 6, reference number 91 generally indicates an upper level class diagram used by the server 12. In this example, the classes include a site class 88, a room class 94, a program class 105, a child class 100, a staff member class 96, a program area class 108, a program area resource class 109 and a resource 107.

The site class 88 has name and address attributes. The room class 94 has name and current course attributes. The program class 106 has type, start date, end date, child, staff member and target observation attributes. The program area class 108 has sub-category, objective, strategies, evaluation, follow up and reflection attributes. The program area resource class 109 has resource and quantity attributes. The resource class 107 has name, category name and quantity available attributes. Staff member class 96 has first name, last name and room attributes. The child class 100 has first name, last name, date of birth, days of attendance and room attributes. The relationships between the different classes is clearly shown in the diagram so does not require further explanation at this stage.

Figure 7:
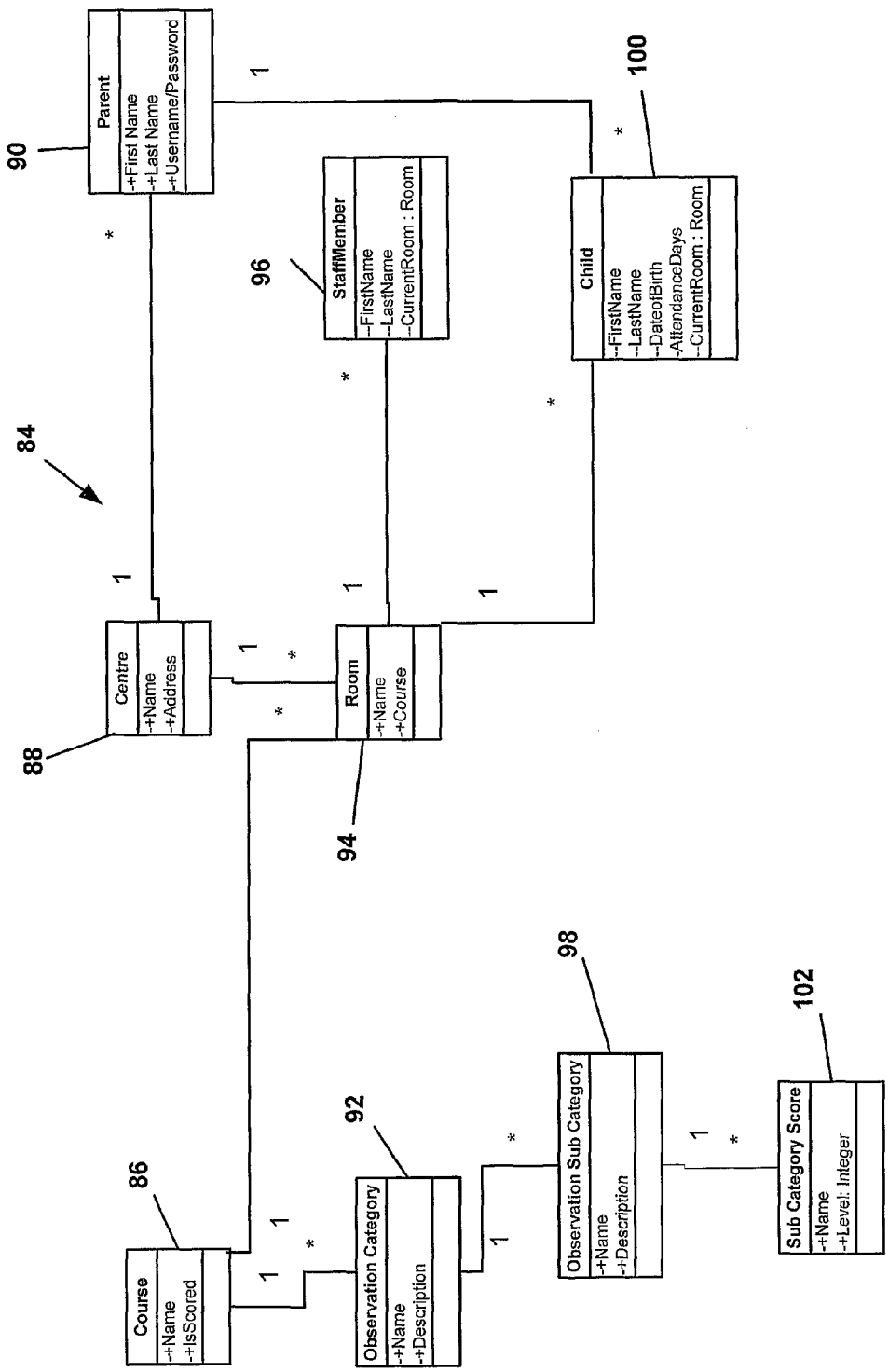
FIG. 7 is a class diagram showing the classes and attributes of various data components for the administration of a childcare centre using the system of FIG. 1.

In FIG. 7, reference number 84 generally indicates a class diagram used by the server 12 to administer each childcare centre. In this example, the classes include a course class 86, the site or centre class 88, a parent class 90, an observation category class 92 the room class 94, the staff member class 96, an observations sub category class 98, the child class. 100, and a sub category score class 102. For the sake of clarity, "category" can be regarded as equivalent to a particular learning area while "sub category" can be regarded as equivalent to a particular learning component as part of a learning area.

The course class 86 has a name attribute and an "is scored" attribute indicating that the particular course is scored. The observation category 92 has name and description attributes. The observation subcategory class 98 has name and description attributes. The subcategory score class 102 has name and level attributes. The diagram also shows the required one to many relationships between the courses and the respective observation categories, sub categories and scores.

The parent class 90 has first name, last name, username/password attributes. The diagram shows the required one to many relationships between the centre, rooms, parents, staff members and children. The diagram also shows the required one to many relationships between the course, rooms, parents, staff members and children.

Figure 8:
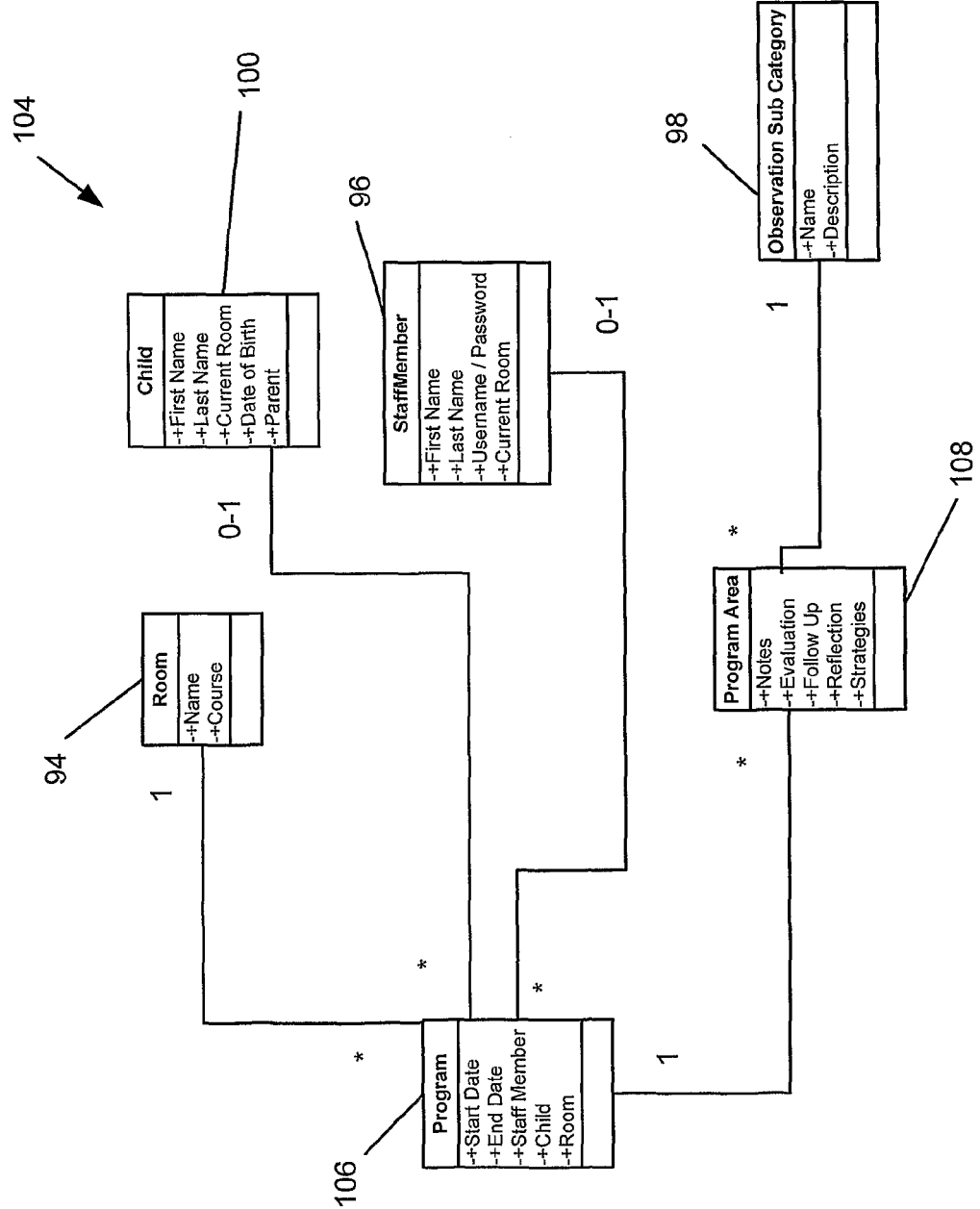
FIG. 8 is a class diagram showing the classes and attributes of various data components used for building a development program for children attending the childcare centre.

In FIG. 8, reference number 104 generally indicates a class diagram used by the server 12 to administer the building of a program for monitoring the development of a child.

In this example, the classes include the room class 94, the program class 106, the program area class 108, the observation subcategory class 98, the child class 100 and the staff member class 96.

The diagram indicates the required one to many relationships between the room and the programs, between the programs and the program areas, between any number of children and the programs, between any number of staff members and the program and between the observation sub categories and the program areas.

Figure 9:
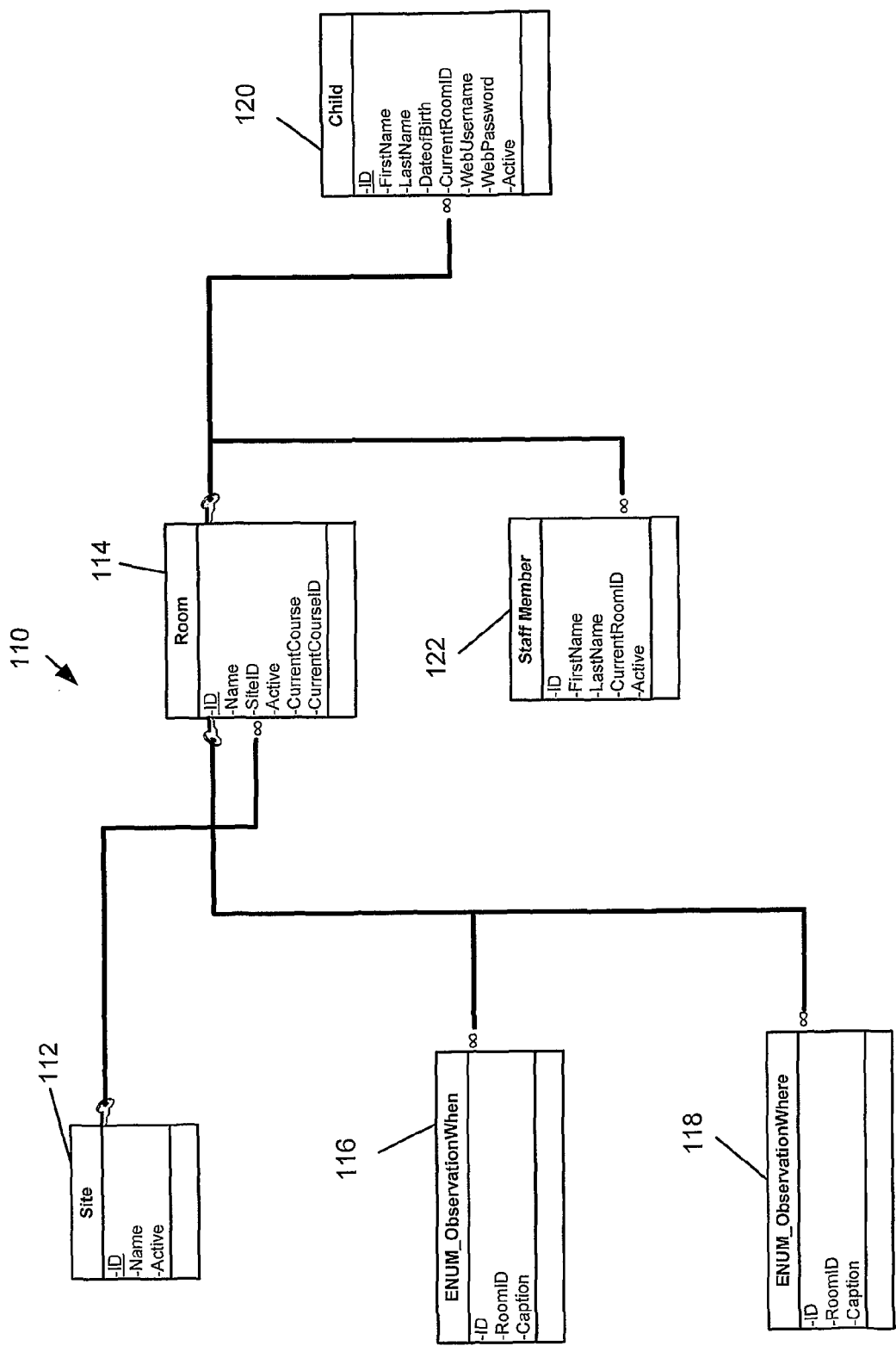
FIG. 9 is a database schema used by the system for the administration of the childcare centre.

In FIG. 9, reference number 110 generally indicates a database schema used by the system 10 for administration of the centre, in accordance with a method of the invention. The schema 110 includes a site table 112, a room table 114, an "observation when" table 116, an "observation where" table 118, a child table 120 and a staff member table 122. The site table 112 includes identification, name and active attributes, with the identification being the primary key. The foreign key for the site table 112 is located in the room table 114. The room table 114 has identification, name, related site identification, active, current course for that room and current course identification attributes.

Foreign keys for the room table are located in the child, the staff member, the observation when and the observation where tables. The child table 120 contains identification, name, date of birth, username, current room identification, Internet user and password details and active attributes.

The staff member table 122 includes identification, name, current room and active attributes.

The observation when table 116 includes an identification attribute which is the foreign key for the room table 114 and room and caption attributes. The observation where table also includes an identification attribute which is the foreign key for the room table 114 and room and caption attributes.

Figure 10:
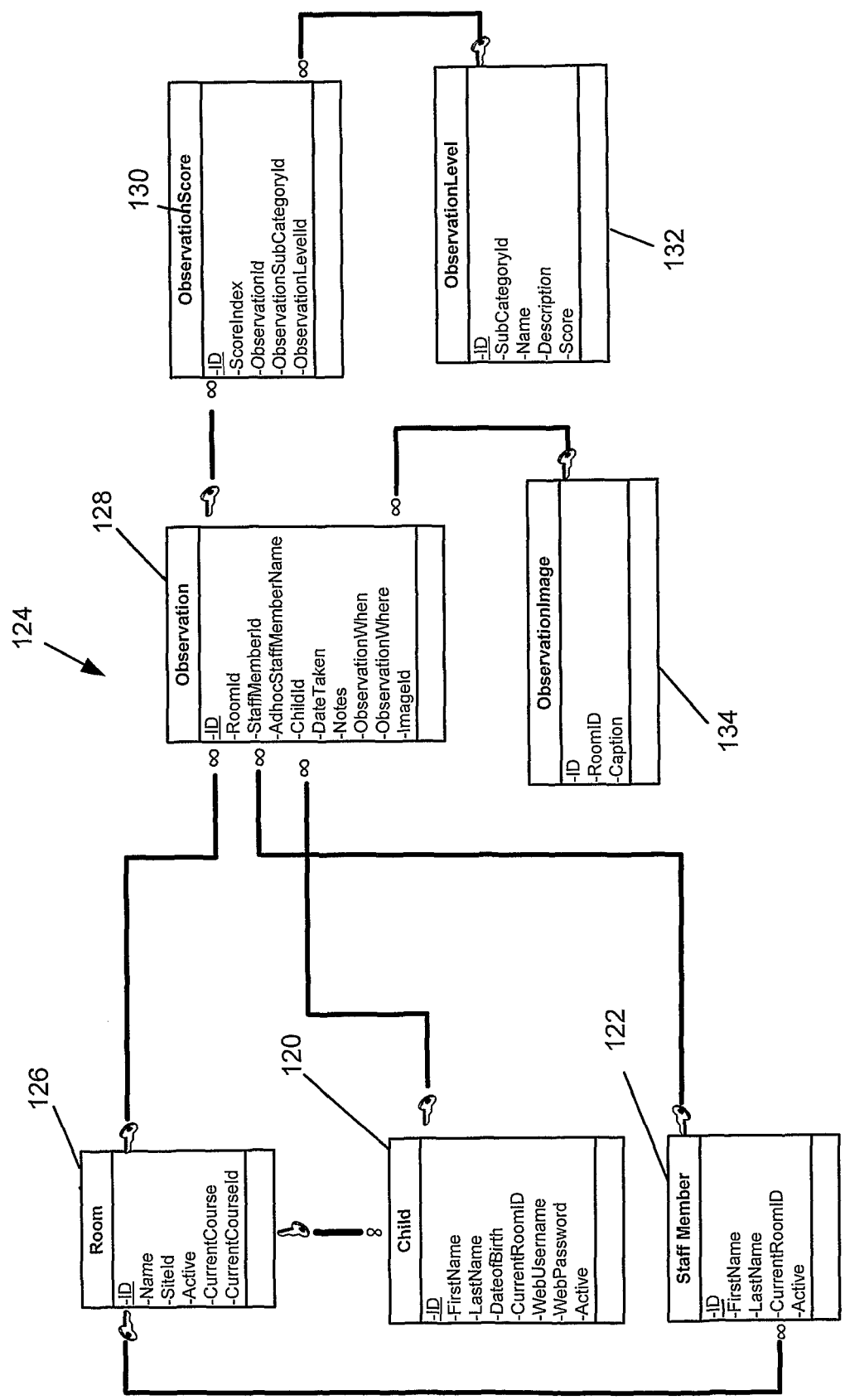
FIG. 10 is a database schema used by the system for recording observations in the childcare centre.

In FIG. 10, reference number 124 generally indicates a database schema used for recording observations. The schema 124 includes the room table 126, the child table 120 and the staff member table 122. The schema 124 also includes an observation table 128, an observation score table 130, an observation level table 132 and an observation image table 134.

The observation table 128 includes identification, room identification, staff member identification, ad hoc staff member identification, child identification, date taken, notes, observation when, observation where and image identification attributes.

The observation score table 130 includes identification, score index; observation identification, observation sub-category identification and observation level identification attributes.

The observation level table 132 includes identification, sub-category identification, name, description and score attributes.

The observation image table 134 includes identification and image data attributes.

The identification of the room is the primary key for the observation table 128 and the room itself is the primary key for each child.

The observation identity is the primary key for the observation score table 130. Foreign keys for the staff member; the child identification and observation image identification are located in the observation table 128

The identification of the, observation level is the primary key for the observation score table.

Figure 11:
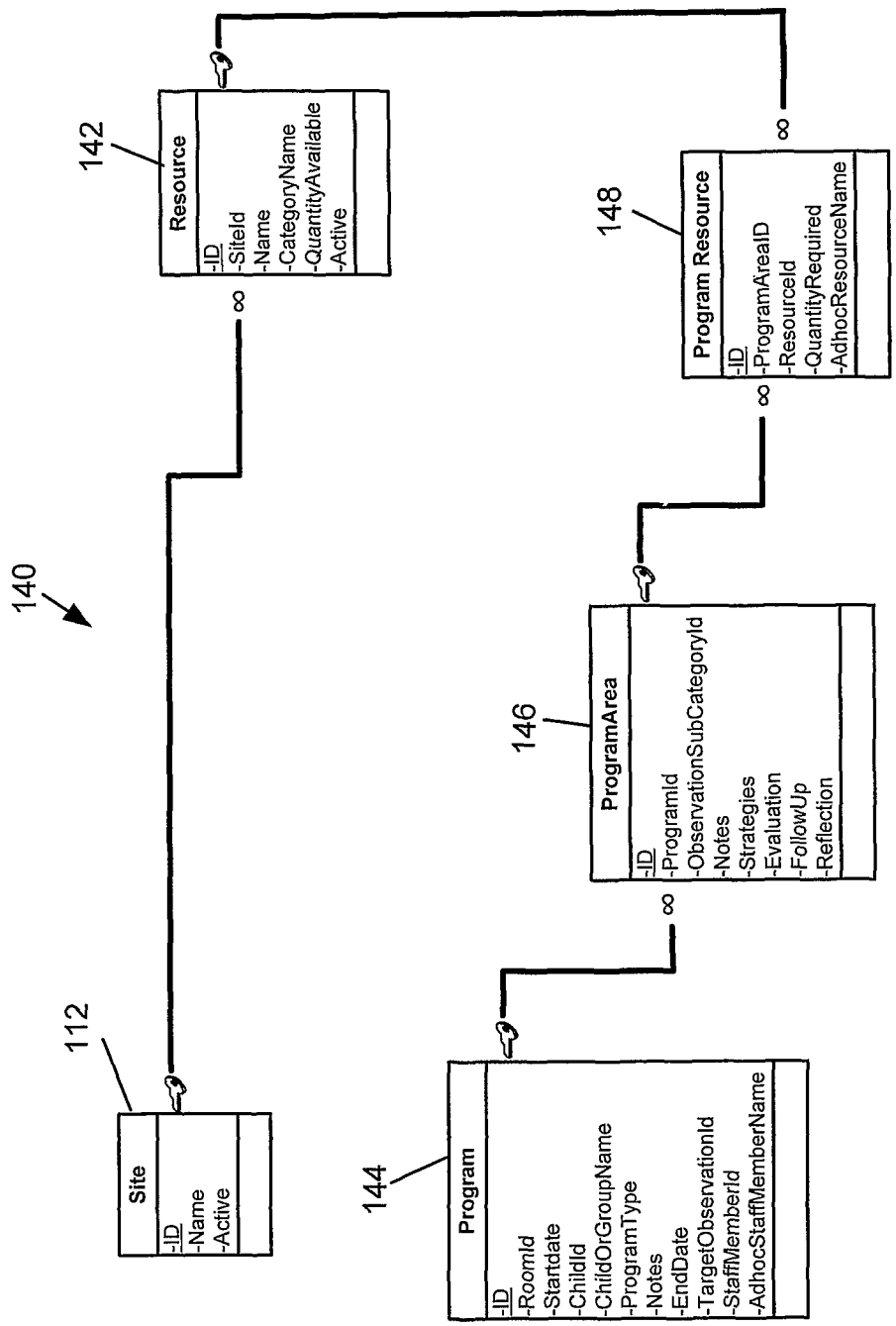
FIG. 11 is a database schema used by the system for building a development program for children attending the childcare centre.

In FIG. 11, reference 140 is a database schema for building a program for monitoring the development of a child.

The schema 140 includes the site table 112, a resource table 142, a program table 144, a program area table 146 and a program resource table 148.

The resource table 142 includes identification, site identification, name, category name, quantity available and active attributes. The program table 144 includes identification, room identification, start date, child identification, child or group name, program type, notes, end date, target observation identification, staff member identification, and ad hoc staff member name attributes. The program area table 146 includes identification, program identification, observation subcategory identification, notes, strategies, evaluation, follow up and reflection attributes. The program resource table 148 includes identification, program area identification, resource identification, quantity required, and ad hoc resource name attributes.

The foreign key for the site identification in the site table 112 is located in the resource table 142. A foreign key for the resource identification in the resource table 142 is located in the program resource table 148. A foreign key for the program area identification in the program area table 146 is located in the program resource table 148. A foreign key for the program identification in the program table 144 is located in the program area table 146.

Figure 12:
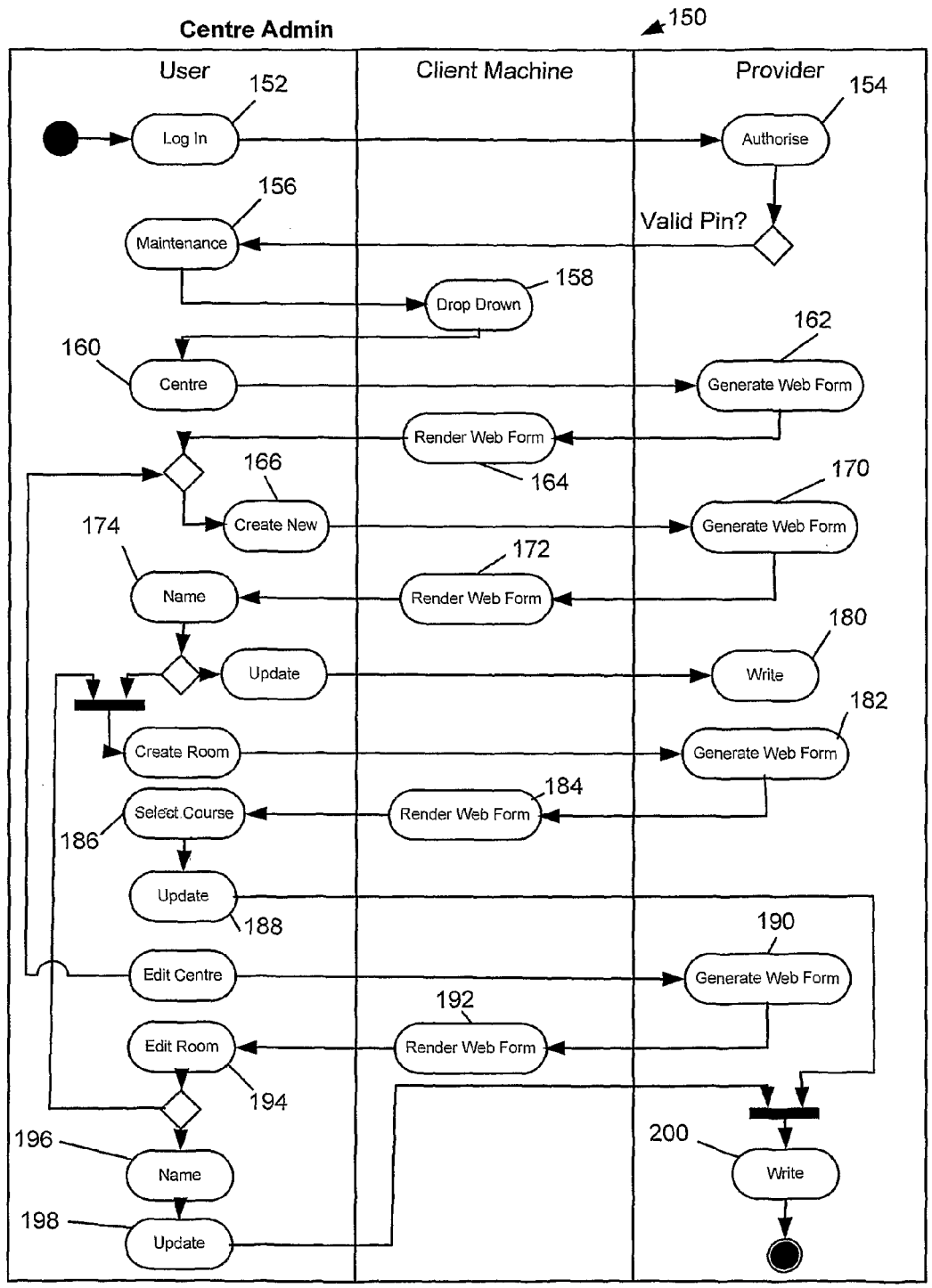
FIG. 12 is an activity diagram indicating the administration of the childcare centre.

In FIG. 12, reference number 150 generally indicates an activity diagram for administering the childcare centre when using the system 10.

The server 12 is configured to generate a login page at 152 on the client machines 16. On receipt of the login details, the server queries the login details at 154. If the login details are valid, the user can select the maintenance menu at 156. In this particular example, the client machine displays a drop-down menu at 158. The user can then select to access the centre at 160. A page request is sent to the server 12 which responds by generating a web form at 162. The web form is then sent to the client machine which renders it at 164. That web form is shown as a screen dump in FIG. 12.

The user can then elect to create a new centre at 166 or edit a centre at 168. If the user elects to create a new centre, a page request is sent to the server 12 which responds by generating a web form at 170. The web form is rendered on the client machine at 172. That web form is shown as a screen dump in FIG. 13. The user then enters the name of the new centre at 174. A user can then decide either to enter just the centre name by updating at 176 or to create a room for the centre at 178. If just the name is entered, the server 12 writes the name to the site table 112 at 180. For the sake of clarity, the word "centre" should be regarded as having the same meaning as the word "site".

Figure 13:
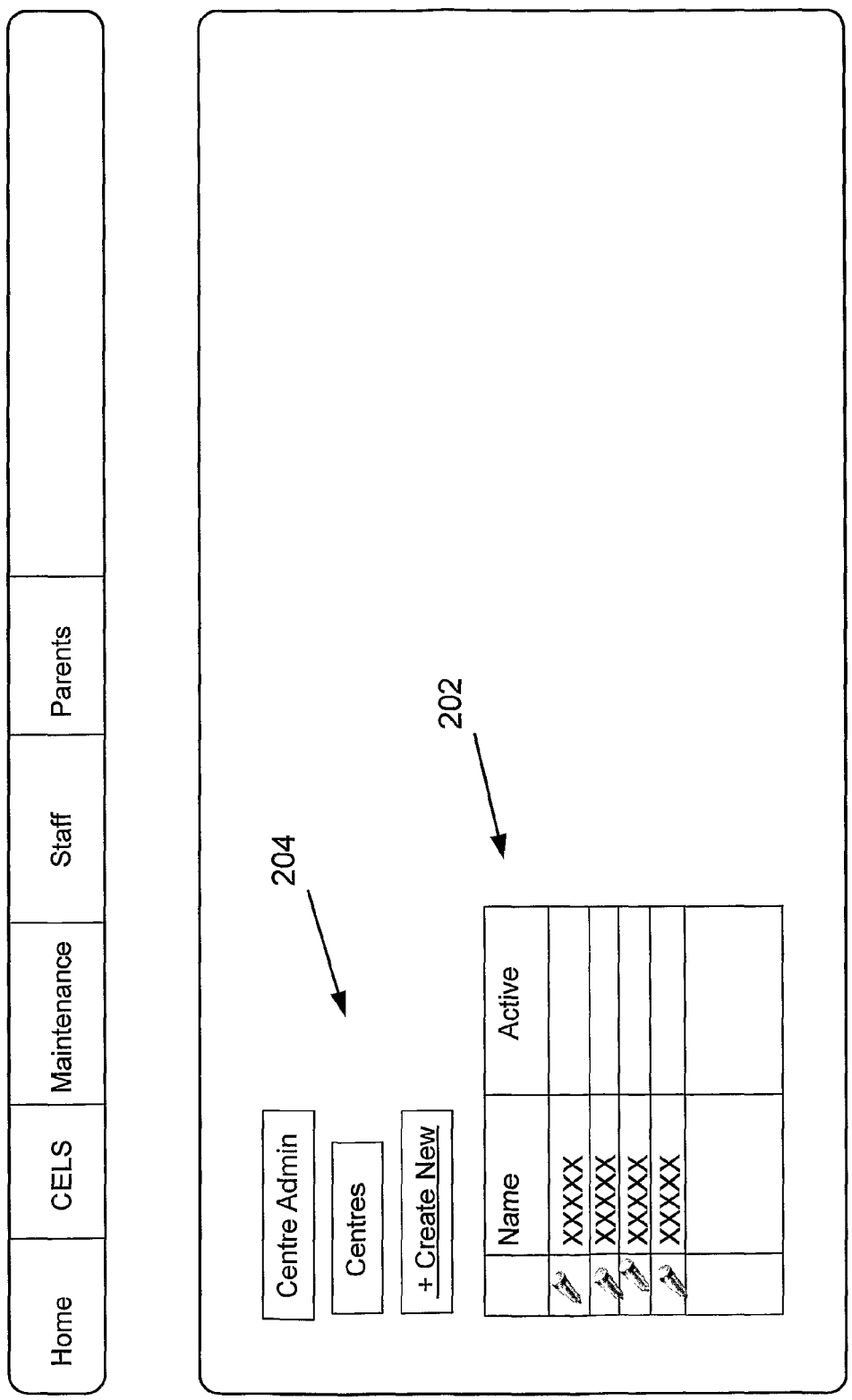
FIG. 13 is a screen dump of a web form for inputting childcare centre details into database tables of the system.

If the user elects to create a new room, a page request is sent to the server 12 which generates a web form at 182 which is rendered on the client machine at 184 and is also shown in FIG. 13. The user can then select a course at 186 and elect to update at 188. The server 12 then writes the course data to the table 114 in the schemes described above.

If the user elects to edit the centre at 178, a page request is sent to the server 12 which generates a web form at 190 to be rendered on the client machine at 192. That form is shown in FIG. 13. When electing to edit the room at 194, the user is given an opportunity to create a room at step 178 or to enter the name of the room at 196 and to update the system at 198. That results in the data being written to the table 114 by the server 12 at 200.

Figure 14:
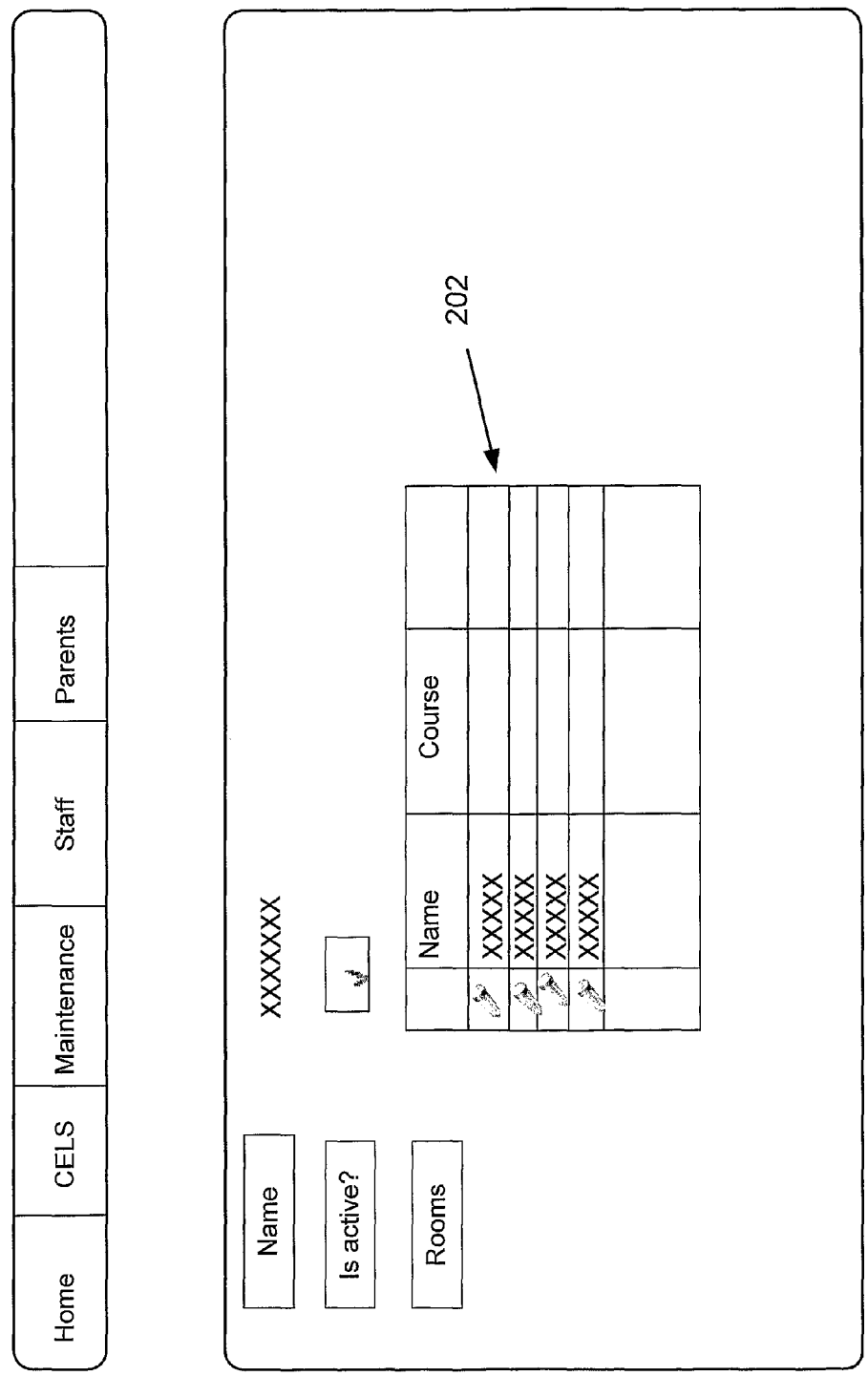
FIG. 14 is a screen dump of a web form for inputting more details concerning the childcare centre into database tables of the system.

As can be seen in FIG. 13 and FIG. 14 which are the screen dumps mentioned above, there is provided a tabular display 202 which allows a user to keep track of the data being entered. In FIG. 12, the "create new" button is shown at 204 while, in FIG. 13, the "create room", "update room", "delete room", "update" buttons are all generated by the server 12 when generating the relevant web form.

Figure 15:
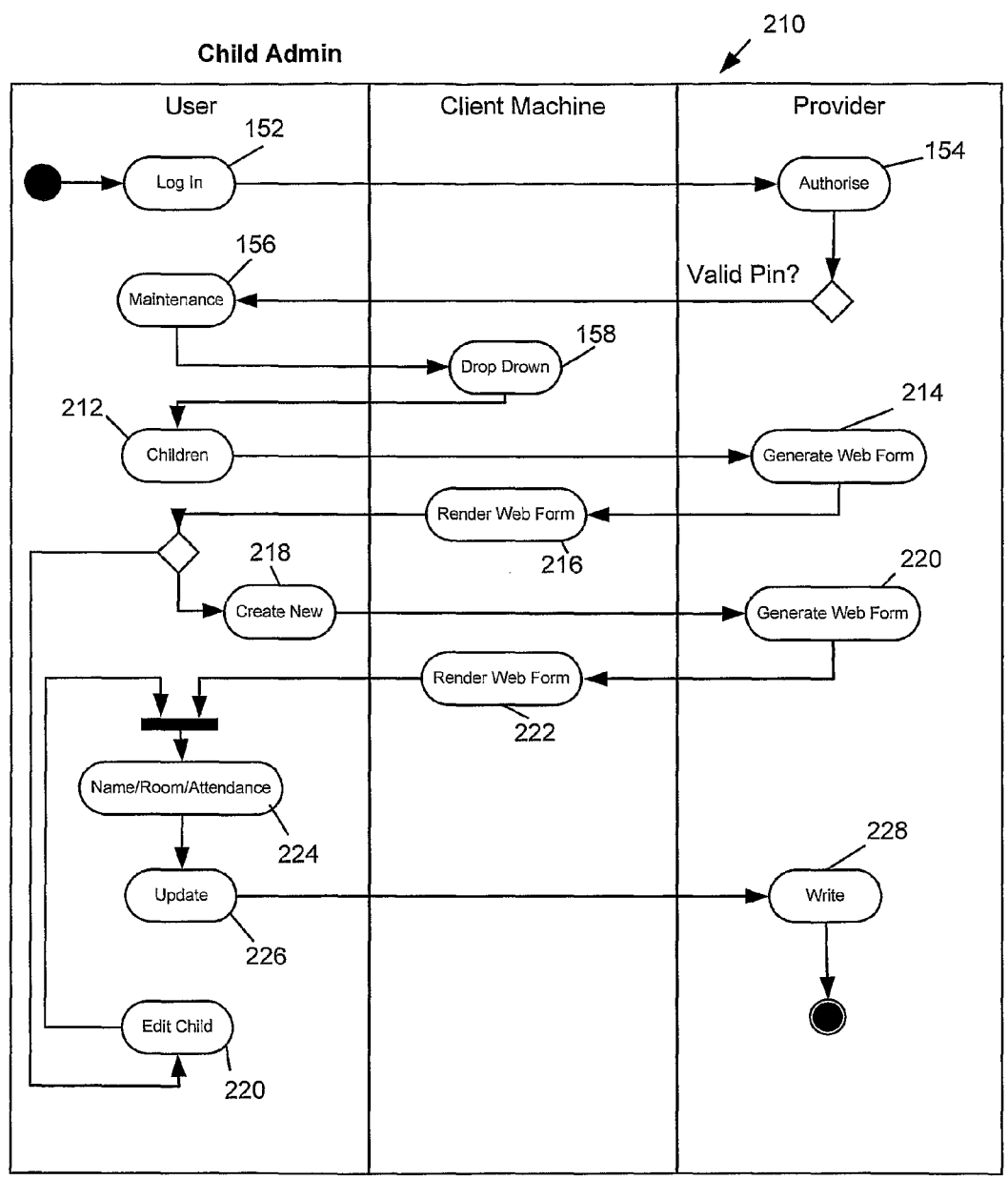
FIG. 15 is an activity diagram indicating the administration of a particular child attending the childcare centre.

In FIG. 15, reference number 210 generally indicates an activity diagram indicating the manner in which a child's details can be updated or edited. With reference to the previous drawings, like references refer to like components, unless otherwise specified.

The steps shown in FIG. 15 are initiated by selecting the maintenance menu as before. However, in this case, the child maintenance menu is selected at 212. As a result, a page request is sent to the server 12 which generates a web form at 214 that is rendered at 216. The user can then elect either to create a new entry at 218 or to edit a particular child's details at 220.

If the user elects to create the new entry, the server 12 responds to a page request by generating a web form at 220. The web form is rendered on the client machine at 222 and is shown as a screen dump in FIG. 16. The web form contains data entry fields for entering name details, room details, and attendance details at 224. The user can then update at 226 so that the server 12 can write the data to the table 120 in FIG. 9.

If the user elects to edit a child's details at 222, the user can perform the step shown at 224.

Figure 17:
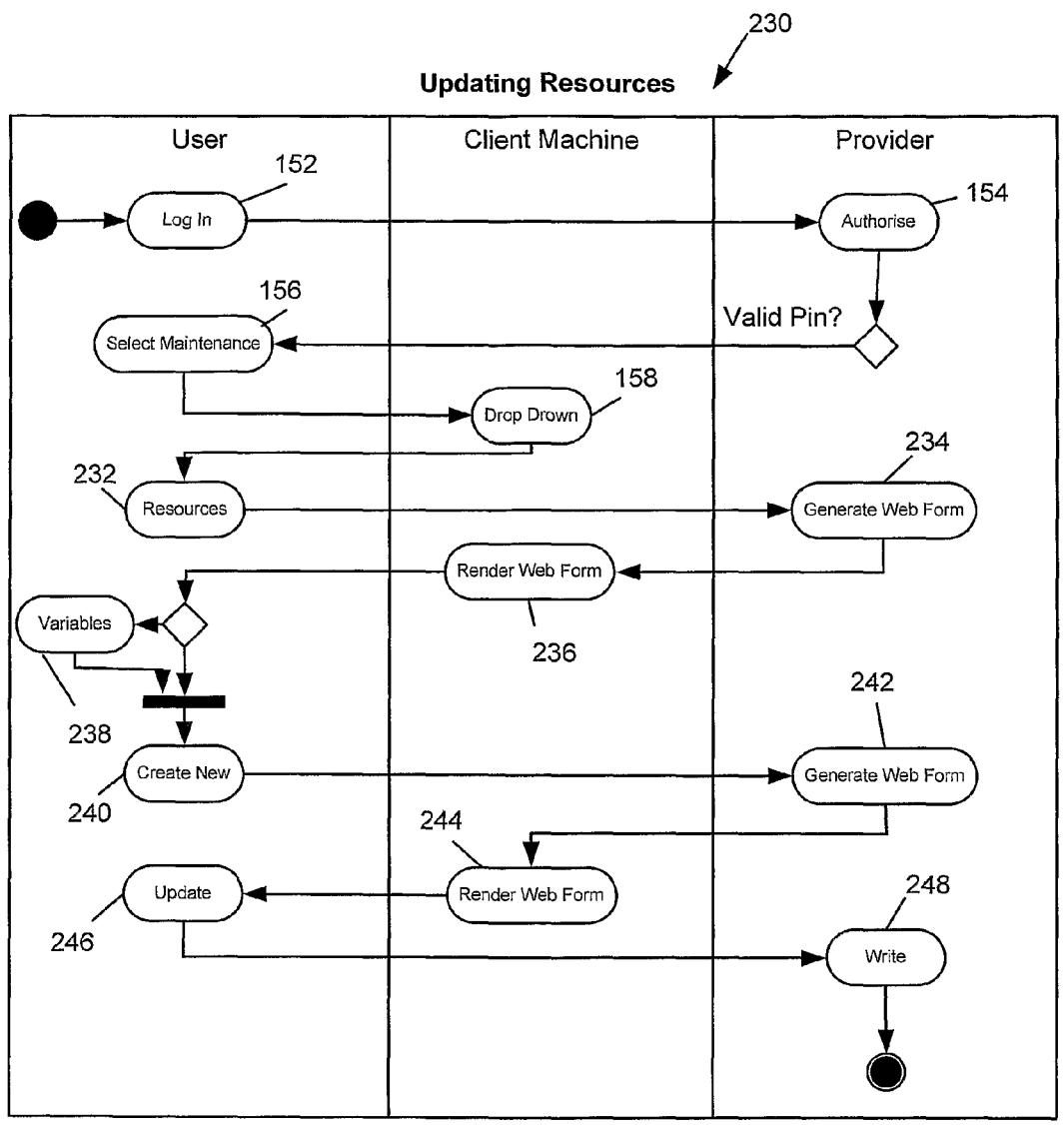
FIG. 17 is an activity diagram for updating resources used by the childcare centre.

In FIG. 17, reference number 230 generally indicates an activity diagram for updating details of resources used by a particular centre. With reference to previous drawings, like references refer to like components unless otherwise specified.

In this example, the maintenance menu is again selected, but this time the resources menu is selected at 232. A page request is sent to the server 12 which generates a web form at 234 that is rendered on the client machine at 236. The web form is configured to allow the user to enter variables at 238 relating to a particular resource before electing to create a new resource at 240 or to proceed directly with creating the new resource. A page request is sent to the server which responds by generating a web form at 242 which is rendered on the client machine at 244. The web form is configured to permit the user to update the resource details at 246 which are then written to the table 142 by the server 12 at 248.

Figure 18:
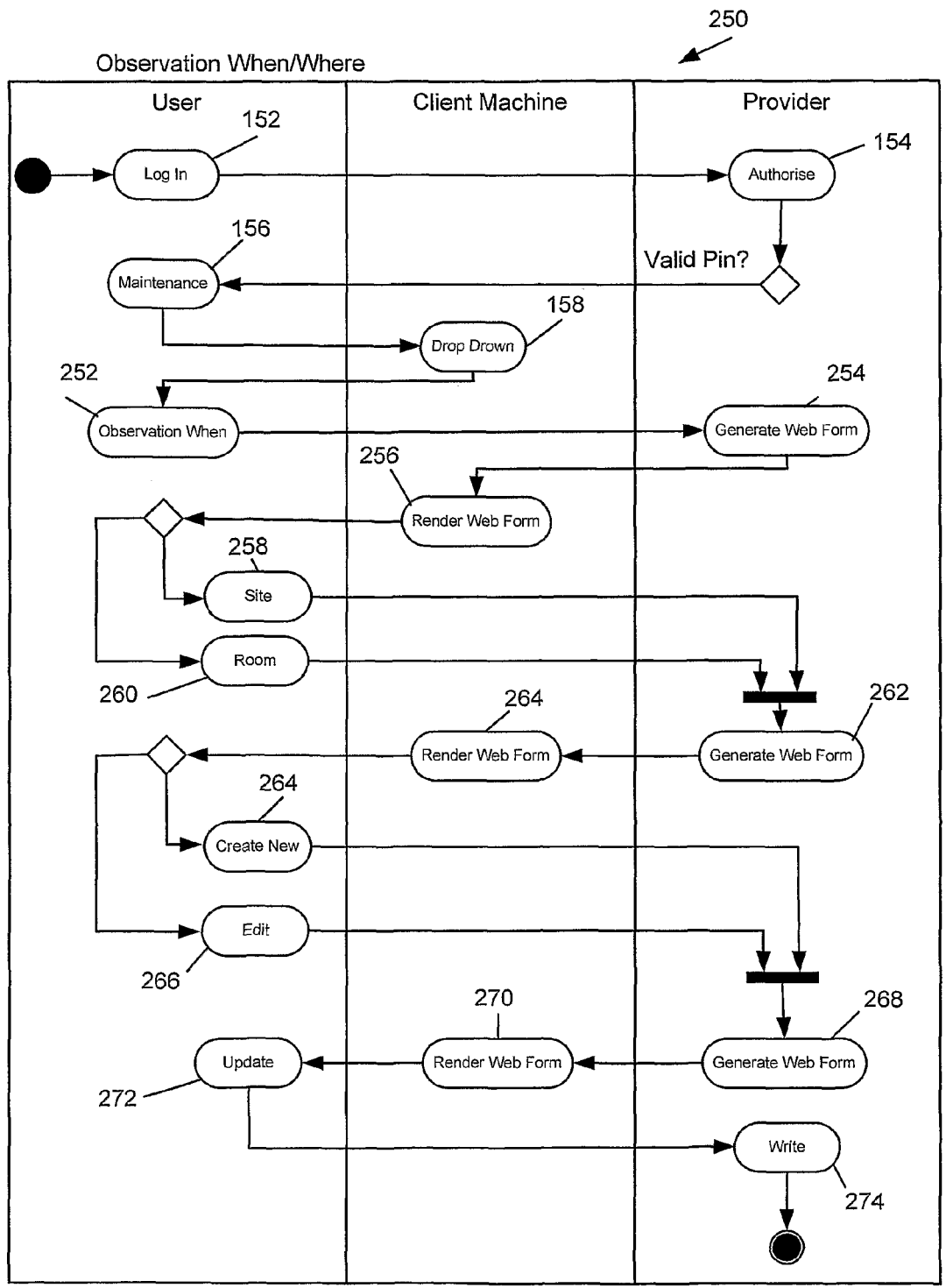
FIG. 18 is an activity diagram for working with details regarding observations made by carers.

In FIG. 18, reference number 250 generally indicates an activity diagram for allowing the user to adjust or add to details regarding the times and the places at which observations are recorded. The relevant tables in this regard are the observation when table 116 and the observation where table 118. With reference to the previous drawings, like reference numbers refer to like components unless otherwise specified.

In this particular example, the maintenance menu is again selected. However, this time an "observation when" menu is selected at 252. For the sake of expedience, this could also be an "observation where" menu. This results in a page request being sent to the server 12 which generates a web form at 254 that is rendered on the client machine at 256. The web form allows the user the option to update the times (or places) of observations for a particular site at 258 or for a particular room at 260. In either case, a page request is sent to the server 12 which responds by generating a web form at 262 that is rendered on the client machine at 264. The web form allows the user the option of creating a new time at 264 or to edit an existing time at 266. Again, in either case, a page request is sent to the server 12 which responds by generating a web form at 268 that is rendered on the client machine at 270. A web form allows the user to select an update option at 272 so that the newly entered data can be written to the relevant table 116 or 118 by the server 12 at 274.

Figure 19:
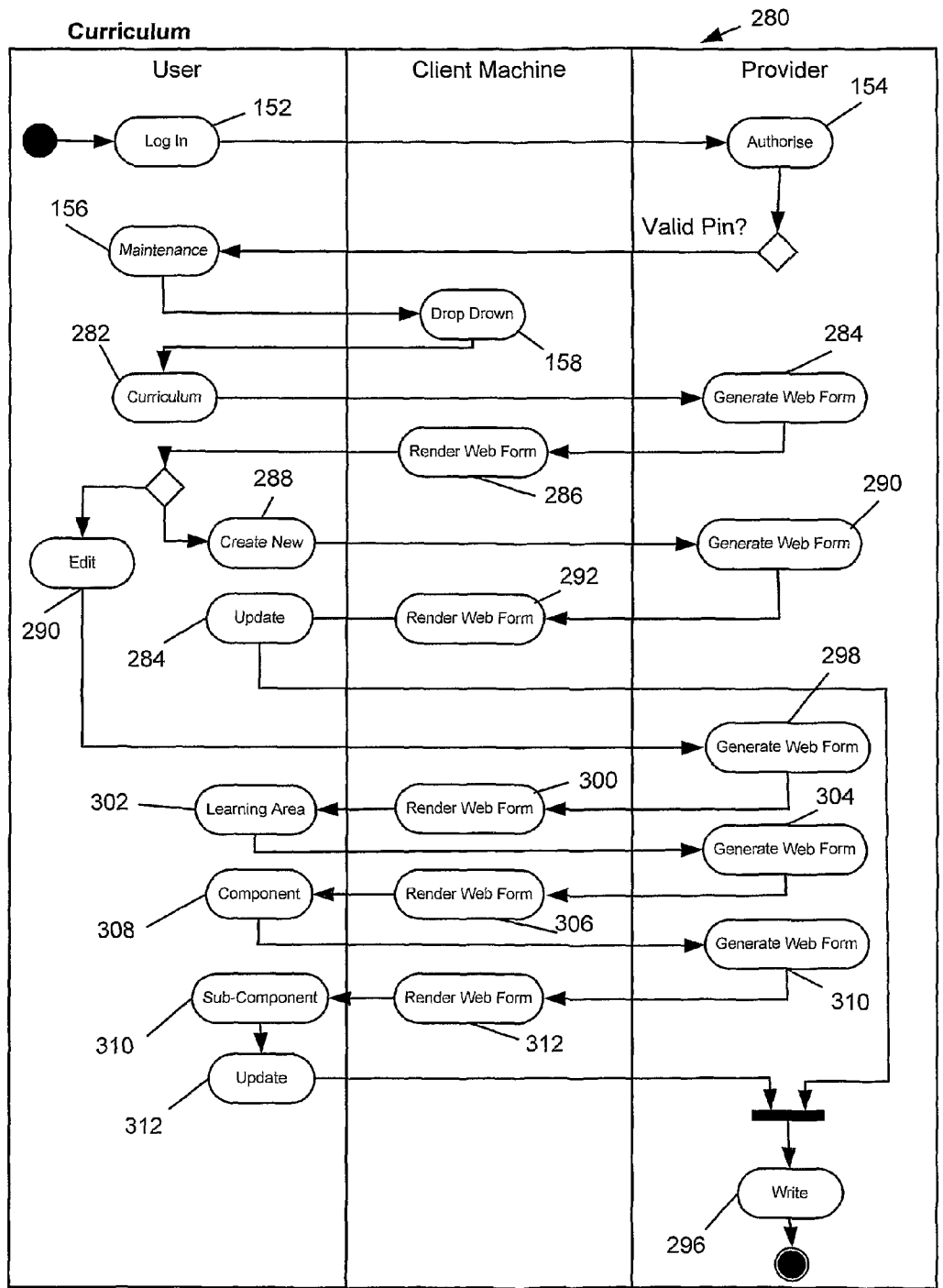
FIG. 19 is an activity diagram for working with details regarding a curriculum to be set by the childcare centre.

In FIG. 19, reference number 280 generally indicates an activity diagram for allowing a user to update a curriculum used by the centre or site. The relevant table in this case is the room table 114, in particular, the current course and current course identification attributes. With reference to the previous drawings, like reference numerals refer to like parts, unless otherwise specified.

Figure 20:
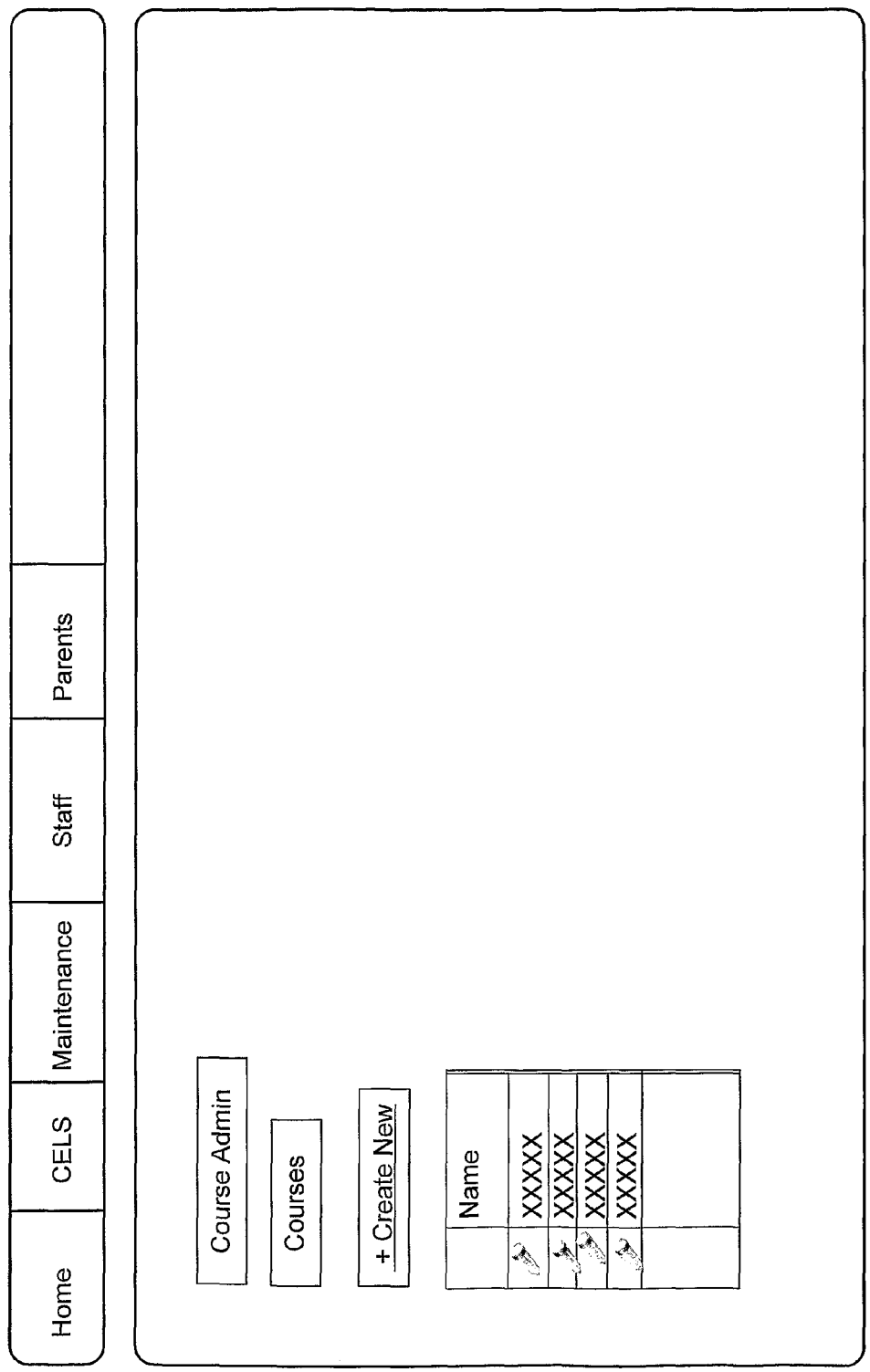
FIG. 20 is a screen dump of a top level web form used for adding or editing curriculum details.

In this particular example, the maintenance menu is again selected. However, this time, a curriculum menu is selected at 282. A page request is sent to the server 12 which generates a web form at 284 that is rendered on the client machine at 286. That web form is shown as a screen dump in FIG. 20. The web form is configured to permit the user to elect either to create a new curriculum at 288 or to edit an existing curriculum at 290. If the user elects to create a new curriculum, a page request is sent to the server 12 which generates a web form at 290 that is rendered by the client machine at 292. The web form is configured to allow the user to select and enter a new curriculum at 294. Details of the new curriculum are written to the table 114 by the server 12 at 296.

If the user elects to edit an existing curriculum, a page request is sent to the server 12 which responds by generating a web form at 298 which is rendered by the client machine at 300. A web form is configured to permit the user to select a particular learning area at 302. A page request is sent to the server 12 which generates a web form at 304 that is rendered on the client machine at 306. That web form is configured to permit the user to select a particular learning component at 308. A page request is then sent to the server 12 which generates a web form at 310 that is rendered on the client machine at 312. The web form is configured to permit a user to elect a subcomponent at 310 and to update the system at 312. As a result, the data is written to the table 114 by the server 12 at 296.

FIG. 21 shows a low level screen dump of a web form generated during execution of the activities shown in FIG. 18. The web form has upper-level selections for various learning areas, mid-level selections for various learning components and low level selections for various learning sub components.

The web form also has a field to permit a user to enter text relating to a description of a particular sub-component It will be appreciated that by considering the tables shown in FIG. 8, the maintenance menu can readily be used to enter or edit data relating to staff members. The relevant activity diagram is not shown. However, it would readily be apparent to a person of ordinary skill in the field to create the necessary activity diagram from the information provided in the preceding paragraphs, Also, the system 10 is configured so that parent details can readily be uploaded into suitable tables. Given the information provided in the preceding paragraphs, it would readily be apparent to a person of ordinary skill in the field how to create the necessary activity diagram for entering or editing parent details.

As can be ascertained from the tables and the related activity diagrams, the curriculum used in the centres can be varied from room to room or between centres depending on the particular requirements of those areas. Furthermore; the curriculums themselves can be adjusted to suit particular requirements.

The maintenance menu allows multiple rooms to be created at any site or centre and also for groups.

Figure 22:
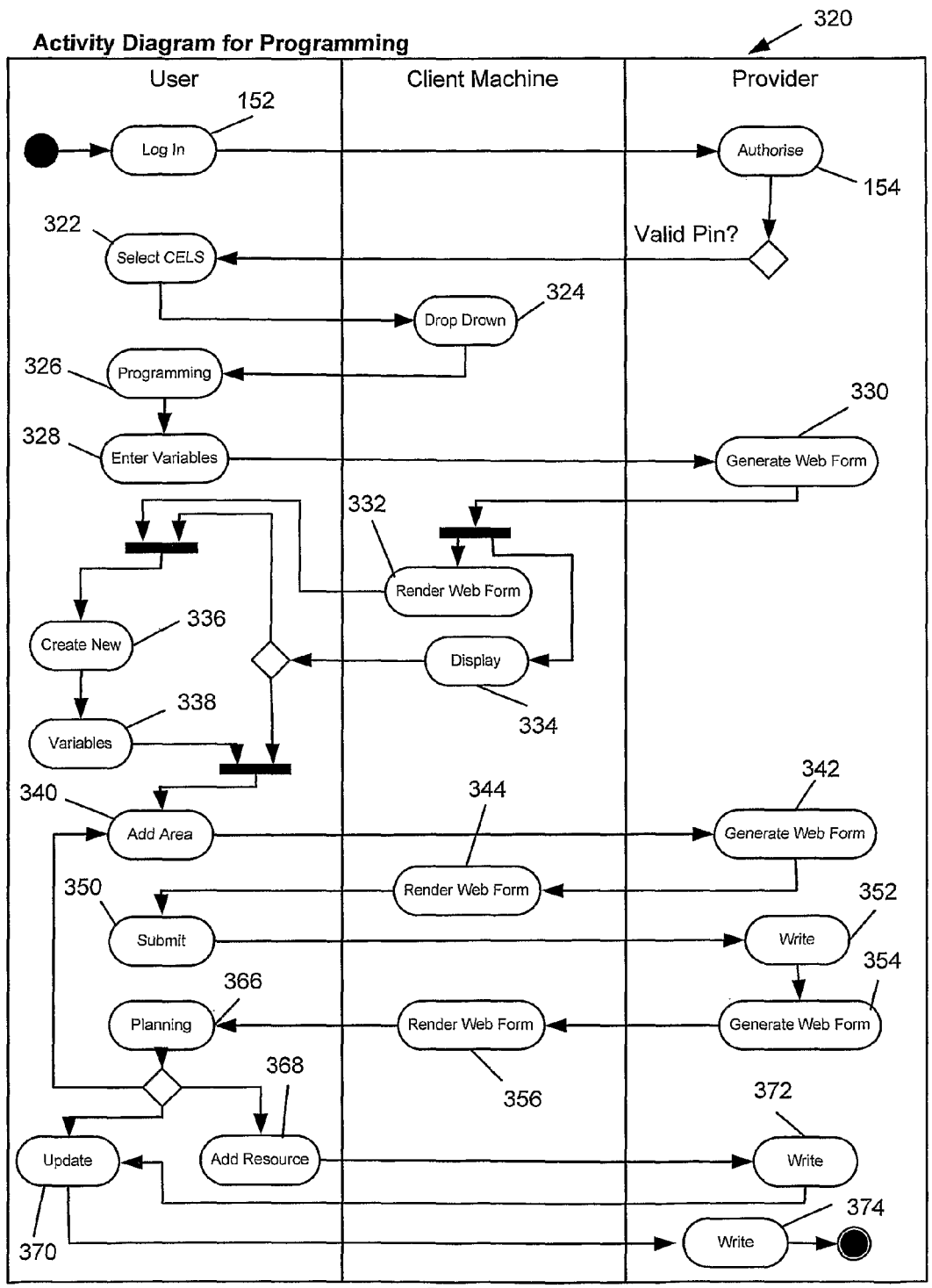
FIG. 22 is an activity diagram for building a development program for children attending the childcare centre.

In FIG. 22, reference number 320 generally indicates an activity diagram for allowing a user to build a program for monitoring the development of a subject, in this case a child or group of children attending the centre. With reference to the previous drawings, like reference numbers refer to like components unless otherwise specified. The relevant tables are the tables shown in FIG. 11 relating to programming.

In this example, instead of selecting the maintenance menu, the user selects a learning system menu at 322. A drop-down menu is generated on the client machine at 324. The user then selects a programming menu at 326 and enters variables relating to the associated site, room, child or group and date range at 328. A page request is sent to the server 12 which generates a web form at 330 which is rendered as both a form 332 and display at 334 representing a current development program related to those particular variables. The server is configured to query the tables in FIG. 11 to generate the display.

Figure 26:
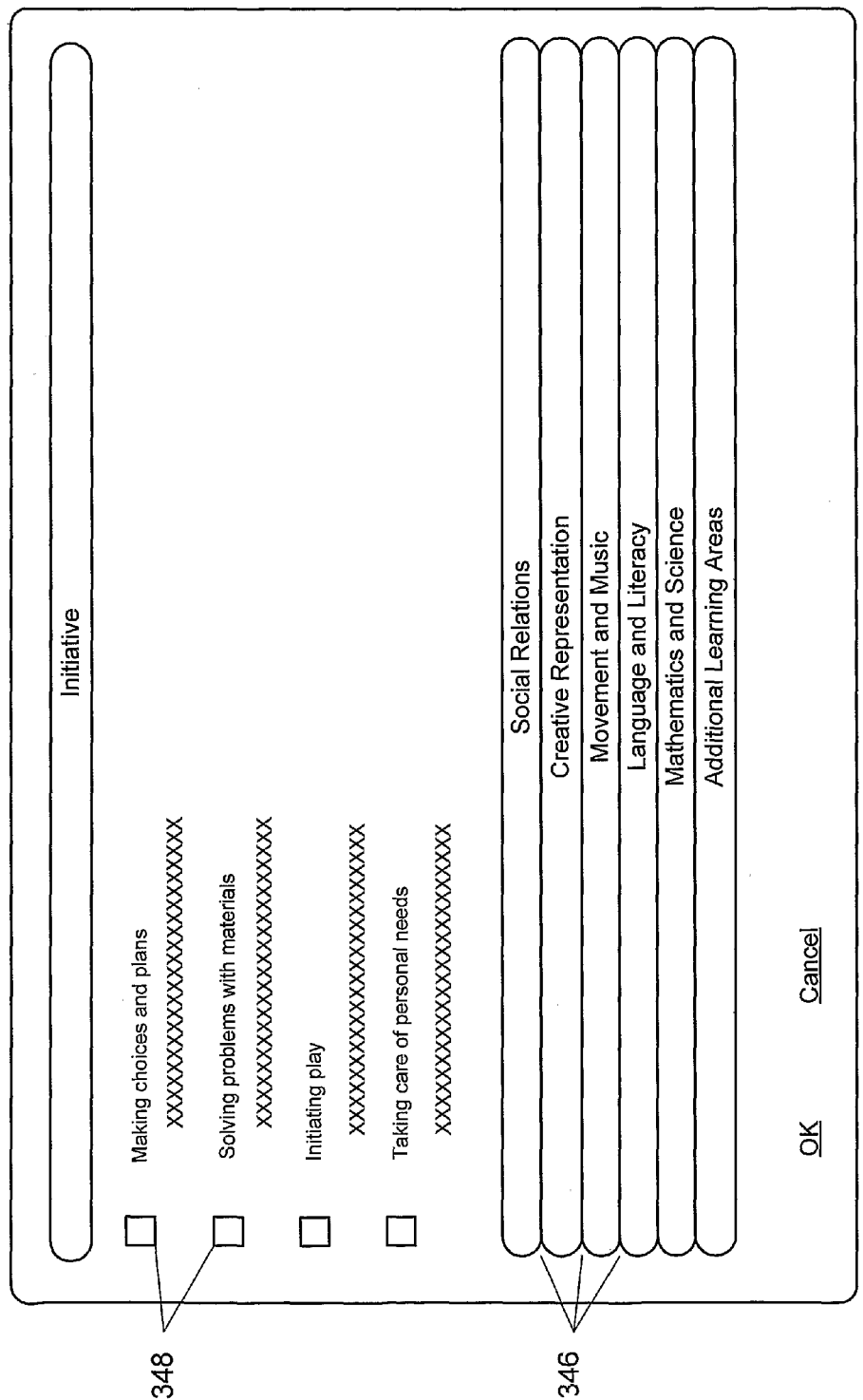
FIG. 26 is a screen dump of a low level web form used for entering learning areas and associated learning components into database tables.

The web form and the display are shown as a screen dump in FIG. 23. The web form is configured to permit a user to elect to create a new program at 336. The user enters variables if required at 338. At this point, the user can elect to add a learning area at 340. A page request is then sent to the server 12 which generates a web form at 342 that is rendered on the client machine at 344. That web form is shown as a screen dump in FIG. 26. The web form has two levels of data entry. An upper-level data entry is carried out by selecting one or more of a number of learning areas indicated at 346 on the web form. A low level data entry is carried out by selecting one or more of a number of learning components indicated at 348 on the web form.

Figure 25:
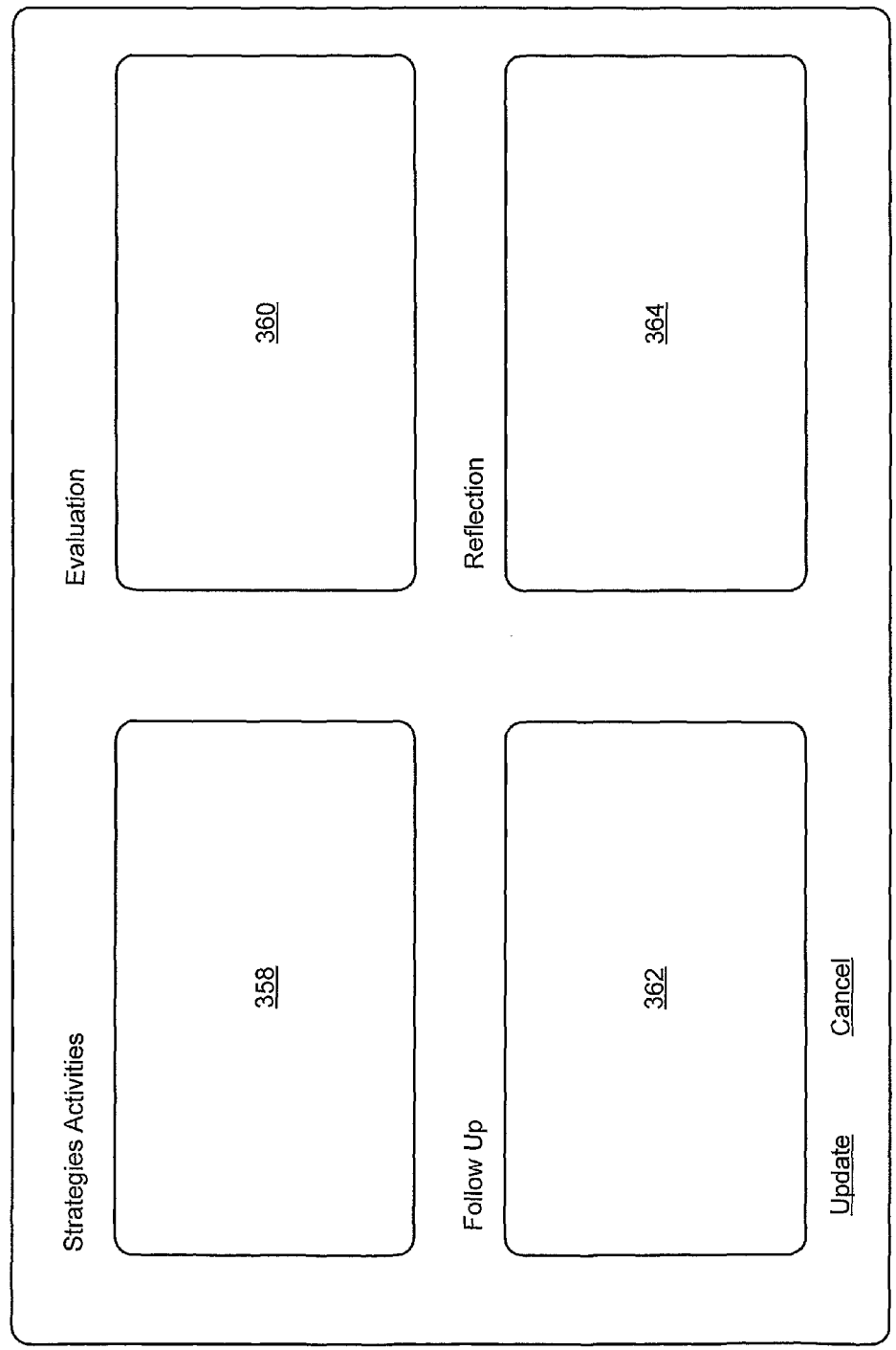
FIG. 25 is a screen dump of a low level web form used for adding or editing planning components associated with a program developed for a particular child or group of children.

Once the user has selected the desired learning areas and learning components, the user can elect to submit data representing those learning areas and learning components to the system at 350. The server 12 writes the data to the program area table 146 at 352 and generates a web form at 354. The web form is rendered by the client machine at 356 and is shown as a screen dump in FIGS. 24 and 25. The web form is configured to define planning fields, indicated generally at 357, 358, 360, 362 and 364 to allow the user to input text relating to planning activities for the program selected at 366. Those planning areas correspond with the notes, strategies, evaluations follow up and reflection attributes in the table 146 and described in the program area class 108 in FIG. 8.

The web form is also configured to permit the user to elect to add a learning area by returning to the step 340, or simply to update at 370.

If the user elects to add a resource, the server 12 writes data relating to that resource to the table 142 at 372 and returns control to the user to update. When the user updates, the server 12 writes the planning data to the table 146 at 374.

Figure 27:
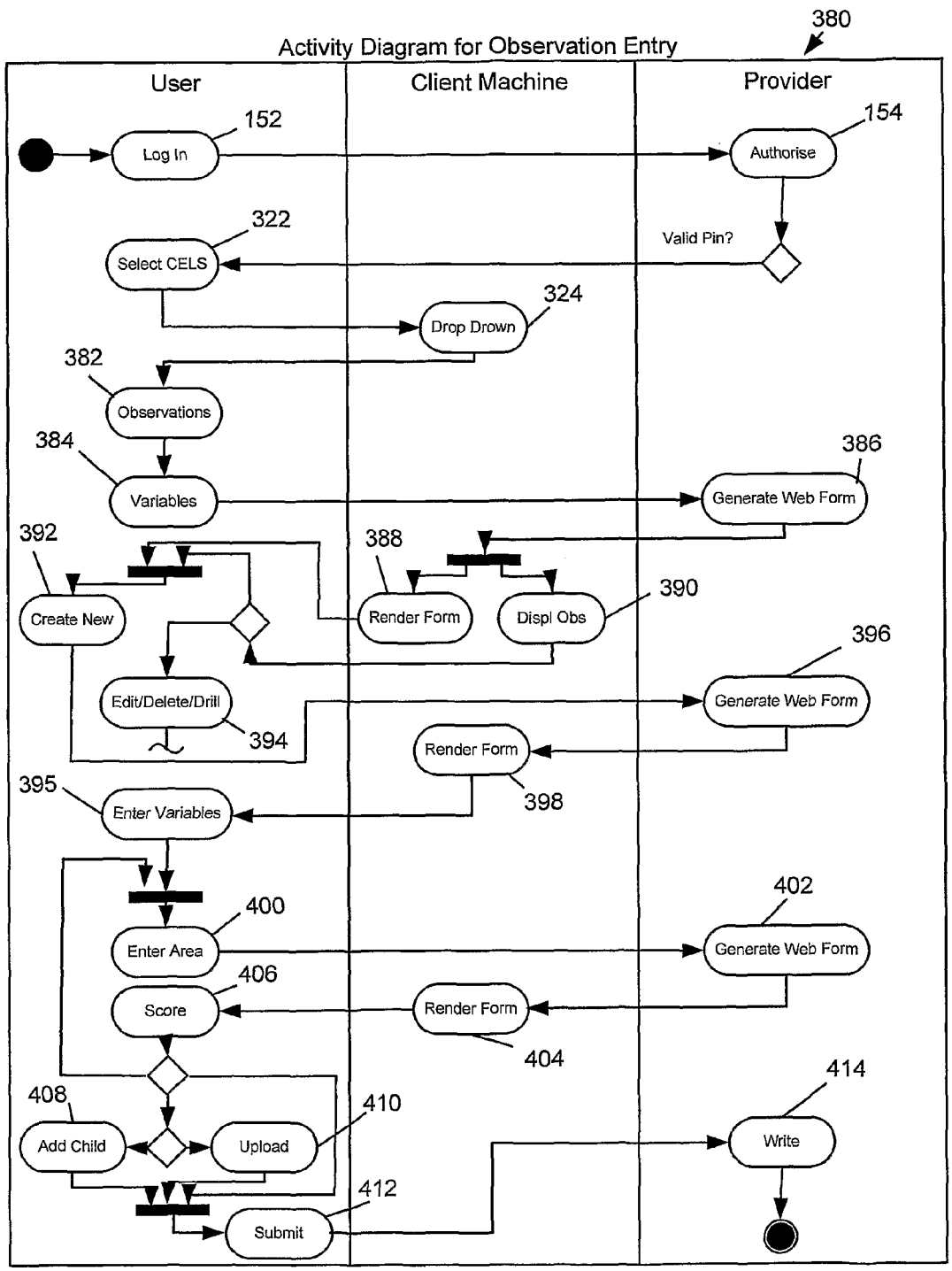
FIG. 27 is an activity diagram for entering observations made by a carer.

In FIG. 27, reference numeral 380 generally indicates an activity diagram for making an observation entry. With reference to the previous drawings, like reference numerals refer to like parts, unless otherwise specified. The relevant tables are those shown in FIG. 10.

In this particular example, an observations menu is selected at 382. The necessary variables such as site, room, child/group, and date range are entered at 384 and written to the room table 126. A page request is sent to the server which generates a web form at 386. The web form is rendered as a form at 388 and as a display of recorded observations for that particular date range and child/group at 390, if available. To achieve that, the server 12 queries the tables shown in FIG. 10 with a suitable string.

Where the observations are displayed, the user is given the option of electing to create a new observation at 392 or to edit, delete or drill down into the observation at 394. In this diagram, the steps for entering a new observation are described.

A page request is sent to the server 12 which generates a web form at 396. The web-form is rendered on the client machine at 398. The web form is shown as the screen dump in FIG. 28. The web form is configured to allow the user to enter variables at 395 representing a date and time of the observation which is stored as a timestamp. Other variables include the teacher or staff member name, where the observation is being made and when the observation is being made. This data is written to the table 128. The form also allows the user to elect to add a learning area at 400. A page request is sent to the server 12 which generates a web form at 402 which is rendered on the client machine at 404. That web form is shown as the screen dump described earlier in FIG. 26 with reference to programming. Once the learning areas and learning components have been selected, the server 12 generates another web form which is rendered as a web form shown as a screen dump in FIGS. 29 and 30. The web form displays the learning areas and associated components that have been selected at 405 on the form. Those relate to the attributes in the observation level table 132. The web form is generated to display scoring fields 403. The server 12 is configured so that a user can select a particular scoring field to view a pop-up display 407 of the scores available for that field. The display is configured to facilitate selection of a relevant score at 406 for each learning component selected on the form shown in FIG. 25 as described earlier for the particular variables entered at 395, which would include a timestamp and a child.

The server is configured so that each score is associated with a respective colour. For example, a low score can be in the red/orange range, while a high score can be in the green range. The colours are selected to provide a distinct contrast between high scoring colours and low-scoring colours. Data relating to the scores corresponds with the attributes in the table 130.

The user can then select to add another learning area by returning to the step at 400. Otherwise, the user can select another child associated with that particular observation at 408 and/or upload a data component at 410 relating to the observation, such as a digital image to be stored in the table 134. The data component is referred to as the image data attribute in the table 134 shown in the schema 124. The user can then elect to submit the data at 412 such that the server 12 can write the data to the relevant tables in FIG. 124 at 414.

It is to be appreciated that the server 12 can be configured such that the user can perform the various activities related to making observation entries while remaining on the observation entry page. This can be done by adding embedded forms or by generating pop-ups so that the user is not required to navigate away from the observation page. This allows the user to make observation entries such as commenting and scoring while in a particular room and viewing the children. An activity diagram explaining a possible example of such a configuration is described below. With such an arrangement, it will even be possible for the user to update and build programs in accordance with the activity diagram 320.

Figure 31:
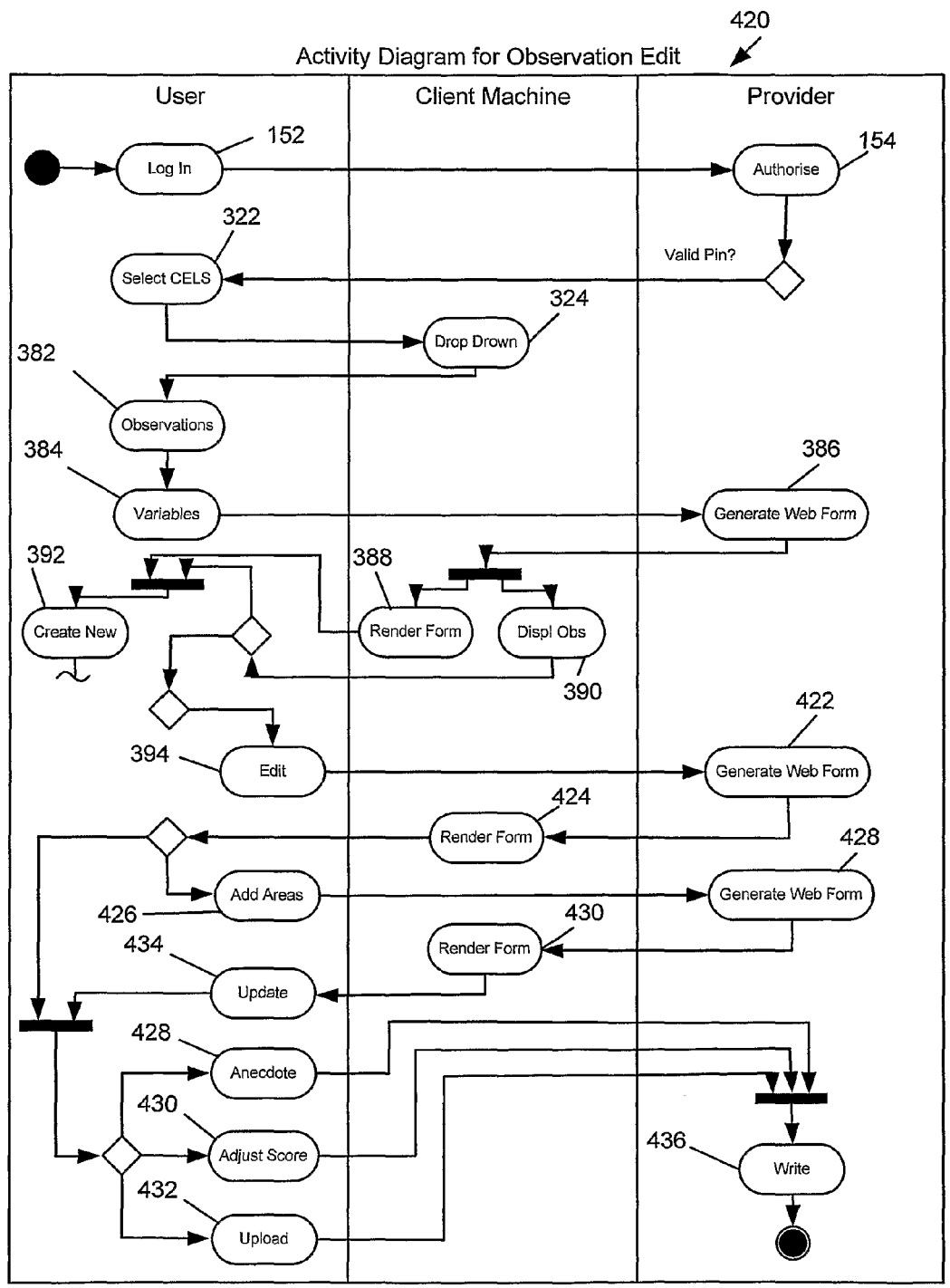
FIG. 31 is an activity diagram for editing observations made by a carer.

In FIG. 31, reference number 420 generally indicates an activity diagram showing the steps associated with editing an observation previously made. With reference to previous drawings, like reference numbers refer to like components, unless otherwise specified.

As referred to earlier, the user can elect to edit an observation at 394. In that case, a page request is sent to the server 12 which generates a web form at 422 which is rendered on the client machine at 424. An example of such a form is shown in FIG. 32. The form allows the user to select between adding a learning area at 426, adding an anecdote at 428, adjusting a score at 430 and uploading a data component such as an image at 432.

If the user elects to add a learning area, a page request is sent to the server 12 which generates a web form at 428 which is rendered on the client machine at 430. The web form is that shown in FIG. 25. Thus, the user is able to use the web form to update learning areas and learning components at 434. The user can then elect to perform one or more of the steps 428, 430 and 432 with the server 12 subsequently writing the data to the relevant tables in FIG. 9 at 436.

Figure 33:
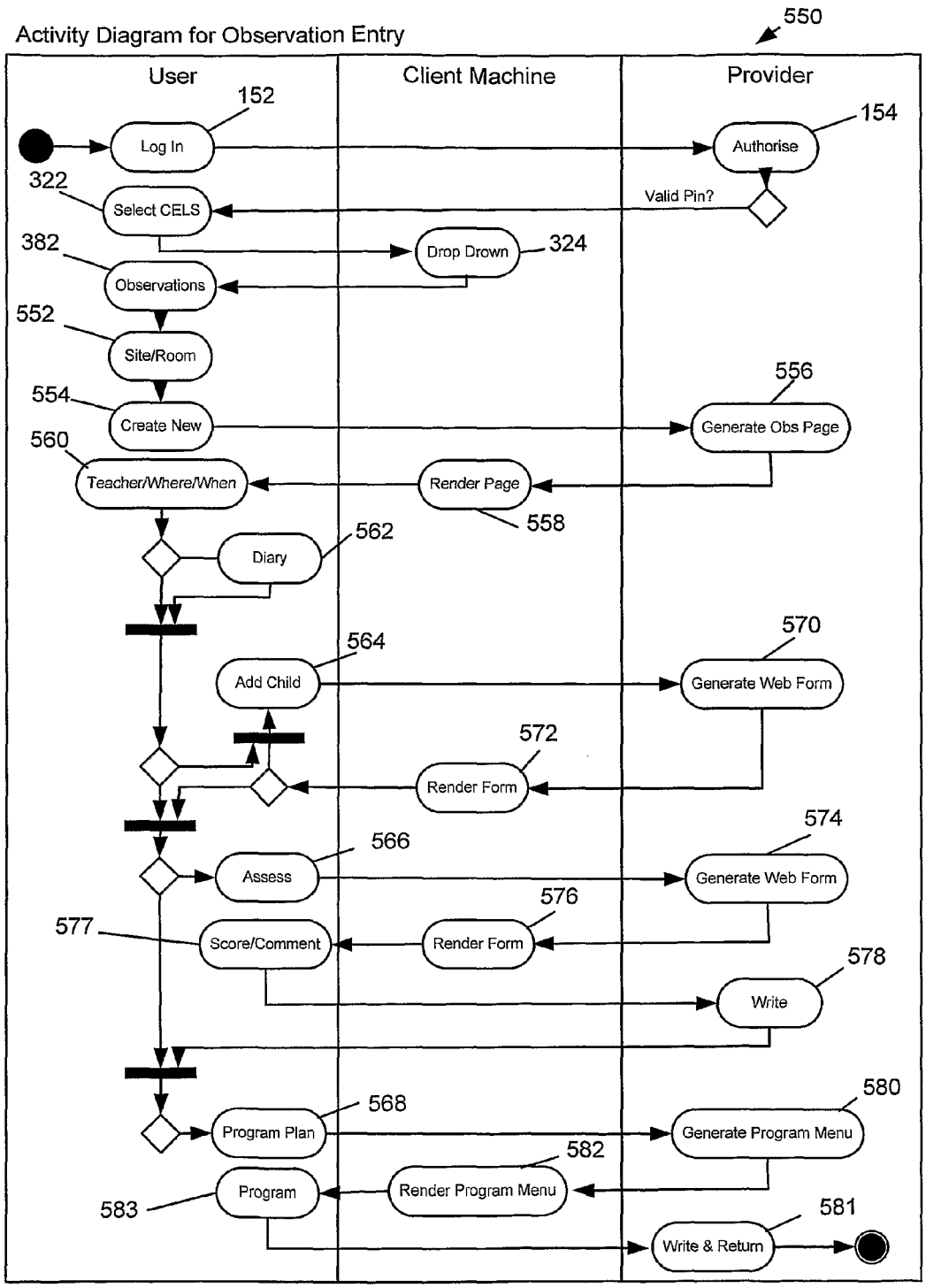
FIG. 33 is an activity diagram for simultaneous input of observation entries.

In FIG. 33, reference numeral 550 generally indicates an activity diagram for an observation entry process that facilitates simultaneously carrying out a number of steps during the observation entry process.

With reference to the previous drawings, like reference numerals refer to like parts, unless otherwise specified.

Figure 34:
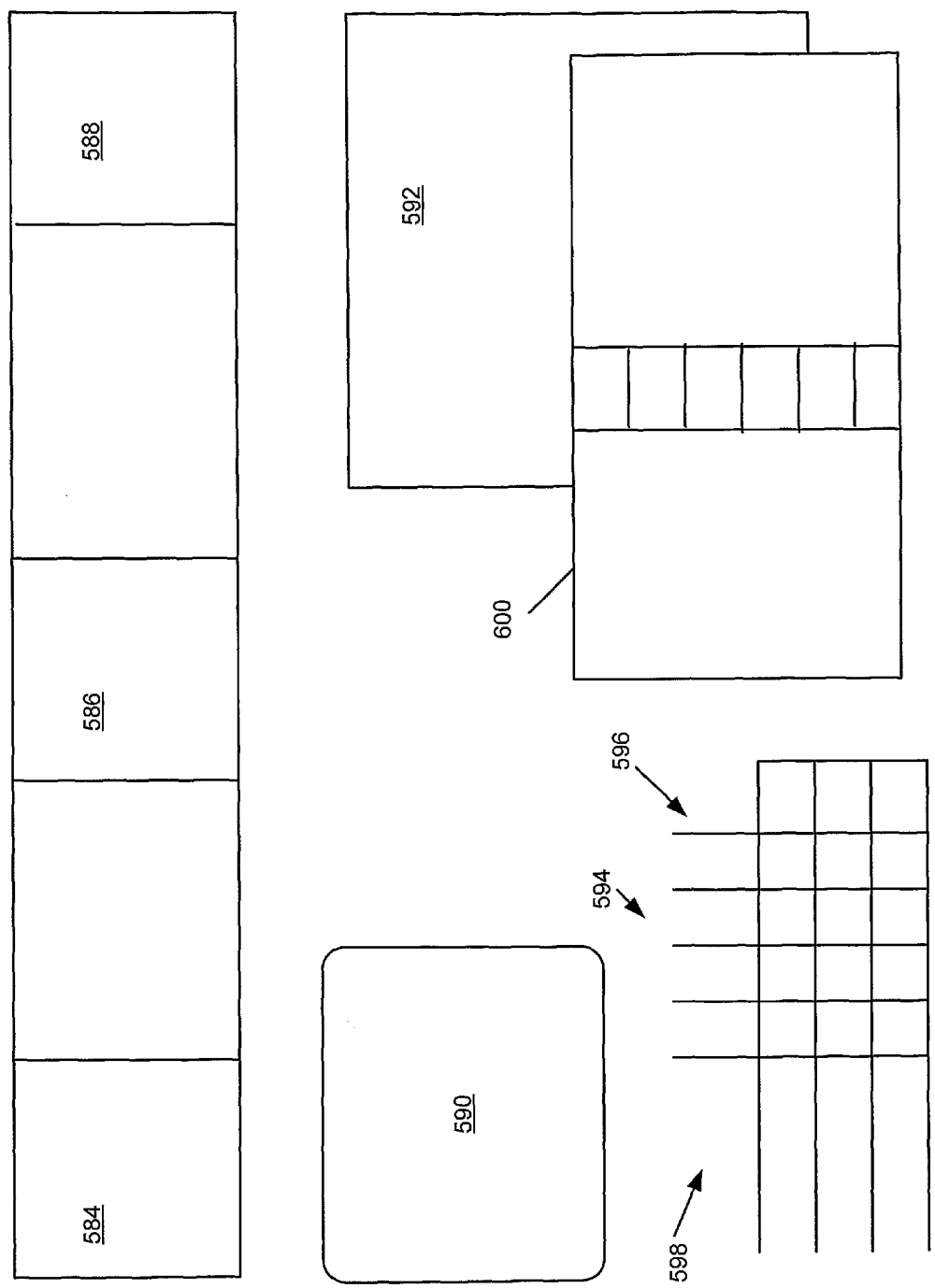
FIG. 34 is a web form generated when carrying out the steps of FIG. 33.

After the observations menu is selected at 382, the user enters the site and the room details in which the observation is being recorded at 552. The user elects to create a new observation at 554. Control passes to the server which generates an observation page at 556, an example of which is shown in FIG. 34. The observation page is rendered by the client machine at 558. At 560, the user can enter the teacher details, a location of the observation and a time when the observation is made in a field 524 of the page. It will be appreciated that the time details can automatically be entered by the client machine as a timestamp.

At 562, a user can elect to select a checkbox in the field 524 which flags the server 12 to make the observation entry available in a daily diary. A user can also elect to add a child at 564, make an assessment at 566 or write a program plan at 568. The server 12 is configured so that the options 564, 566 and 568 are made available without navigating away from the observation page thus facilitating simultaneous input of this data to the respective tables in the manner described above.

If the user elects to add a child, the server 12 generates a web form at 570 which is rendered onto the page on the client machine at 572. The user can then elect to add another child at 564 or to select one of the other options. It will thus be appreciated that the observation page can be used to generate a group of children in respect of which certain observations are to be made. Thus, for example, when a teacher observes a child performing some form of developmental activity in association with other children, the group can be assessed as a unit and a particular child can also be assessed individually so that the child can be measured against the group if necessary.

If the user selects to assess a child or group of children, the server 12 generates a web form at 574 which is rendered onto the observation page on the client machine at 576. Control then passes to the user who can make a comment in connection with an observed behaviour and, if necessary, entered a score against a particular learning component at 577. Control then passes to the server 12 which writes that data at 578 to the tables shown in FIG. 9, as described above.

If the user selects to write a program plan, control passes to the server 12 which generates the programming menu in FIG. 21 at 580. The programming menu is rendered at 582 and the user plans a program according to the activity details shown in FIG. 21 at 583. Control passes to the server 12 which writes the program details to the tables shown in FIG. 11. The user is then returned to the observation page.

In FIG. 33, there is shown the observation page schematically. The observation page includes the area 584 in which date, teacher, place of observation, time of observation and a diary checkbox fields are rendered on the client machine. The observation page also includes an area 586 rendered by the client machine to display learning areas and learning components added by the user to be associated with the particular observation. Furthermore, the observation page is rendered to define an area 588 in which the selected children are displayed.

The observation page is generated also to include an image area 590 in which an image uploaded by the teacher is displayed. The children selected by the teacher can be those shown in the image. Thus, during the observation, the teacher can use the image recordal device or digital camera 19 to record an image of the children and uploaded image into a specified folder on the client machine. When the teacher elects to upload an image the specified folder is accessed automatically so that the teacher can select the image. The image recordal device 19 can be wirelessly connected to the client machine to enable the teacher to record relevant data, for example, in the form of an image, which is in uploaded into a specified location, such as a folder on the client machine. In an alternative arrangement, the image recordal device can be wirelessly connected to either the client machine or the server such that the recorded data can be uploaded directly to the server. It is to be appreciated that the connection need not be wireless.

An anecdote field 592 is generated so that the teacher can enter anecdotal information concerning the activities carried out by, for example, the selected group of children during the observation.

When the teacher elects to make an assessment, a table 594 is generated on the observation page. The table displays, in a first row 596, the names and ages of the children selected by the teacher. The table also displays, in a first column 598, various learning areas and learning components. The server 12 is configured so that when a cursor is hovered over a particular cell, a web form 600 is displayed on the observation page.

The web form 600 displays a scoring column 602 which contains a series of rows corresponding to score values. The score values can range from a blank entry which is selected when it is desired not to add a particular area to an observation. A zero entry is selected when it is desired to leave a score empty. Further score values, for example, increasing from a low number representing a low score and a high number representing a high score are displayed on the form 600.

Each of the score values can be associated with a respective colour. The scores and the colours can be written to the master record and child master record as described below.

In this fashion, while the observation page is open, the table 594 can be populated with score values and associated colours to subsequently be written to the master record described below.

During teaching or any other related activity, the relevant staff member is often in a situation where a particular behavioural trait is observed in one or more subjects, in this case, children. By using the steps set out in the activity diagram 550, the staff member is able to carry out a number of steps while actually viewing the trait. As is set out above, this can include making comments, entering scores, making program adjustments or even developing new programs. As a result, it is not necessary for that staff member to attempt, at some later data or time, to recall various observations. The applicant has found that this is an efficient and accurate manner of recording observations since inner processing by a staff member can result in an inaccurate recollection. Furthermore, the staff member may simply forget or may not have enough time away from the centre to properly record observations. Thus, the steps shown in the activity diagram 550 can ensure that the time spent by a staff member in a developmental location can be utilised fully. Furthermore, the staff member is not burdened with the task of having to recall observations and to record them for subsequent storage or reporting.

Figures 35, 36:
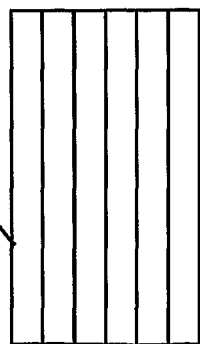
FIG. 35 is a master record generated by querying the databases and representing scores of children in respective learning areas.
FIG. 36 is a pop-up window displaying information relating to a particular score in the master record.

As described earlier with reference to FIG. 5, the server 12 is configured to perform an algorithmic process on scoring values. In this example, the server 12 is configured to generate average scores for children over a given time period in respect of various learning components. The server 12 is configured with suitable database queries so that, when the queries are executed, the server 12 is able to generate a development table as shown in FIG. 35. The query is configured to write a first column 442 of children's names and a second column 444 of associated ages of those children. A first row 446 of learning area IDs is written and a second row 447 of learning component IDs is written. The resultant cells are then populated with the scores associated with the respective learning component and associated child. It will be appreciated that this information is extracted from the tables in FIG. 10 which are built in accordance With the activity diagrams described above. Since each of the scores is associated with a respective colour, it will be readily apparent which of the children are lagging or excelling in certain area and components when compared with the other children.

Furthermore, the development table can be used to indicate which components required further attention by a staff member. For example, where a particular component is left blank, that would flag that, for some reason, that component is not being scored sufficiently with respect to a particular child.

The colour-coded scores can identify those children who need additional program plans to progress to learning or they can flag children with a learning disability. It will readily be appreciated that further colour codes can be added for additional learning indicators if required.

The server 12 is configured so that when a cursor is hovered over a particular cell a pop out 449 is displayed. The server 12 is configured to write data from the observation tables shown in FIG. 10 to fields 445 in the pop out. Thus, the information presented in the pop-up can relate to information entered while carrying out the steps described in the activity diagrams relating to observation entry shown in FIGS. 27 and 33.

The server 12 is configured so that, when a cursor is hovered over a learning component ID representing a particular learning component, details of the learning component are displayed in a pop up box 449. This can be a learning statement describing the learning component.

The server 12 can be configured so that the relevant staff member or user can access the programming menu from the development table such that the steps shown in the programming activity diagram 320 can be carried out to update a program in response to the information presented by the development table.

In particular, it is to be appreciated that the master record displays each child's name, associated observations and associated assessments of learning. This drills down to 3 levels including from the top level, learning areas, learning components and colour-coded scores. The first and second levels are accessed by hovering the cursor over the relevant cell.

The master record can show in one view, those children that have or have not been observed across learning areas and learning components; program plans that have not been developed for particular learning areas or components; children that have or have not been assessed on all learning components; and whether program plans need to be developed for a child or for a group of children.

Figure 37:
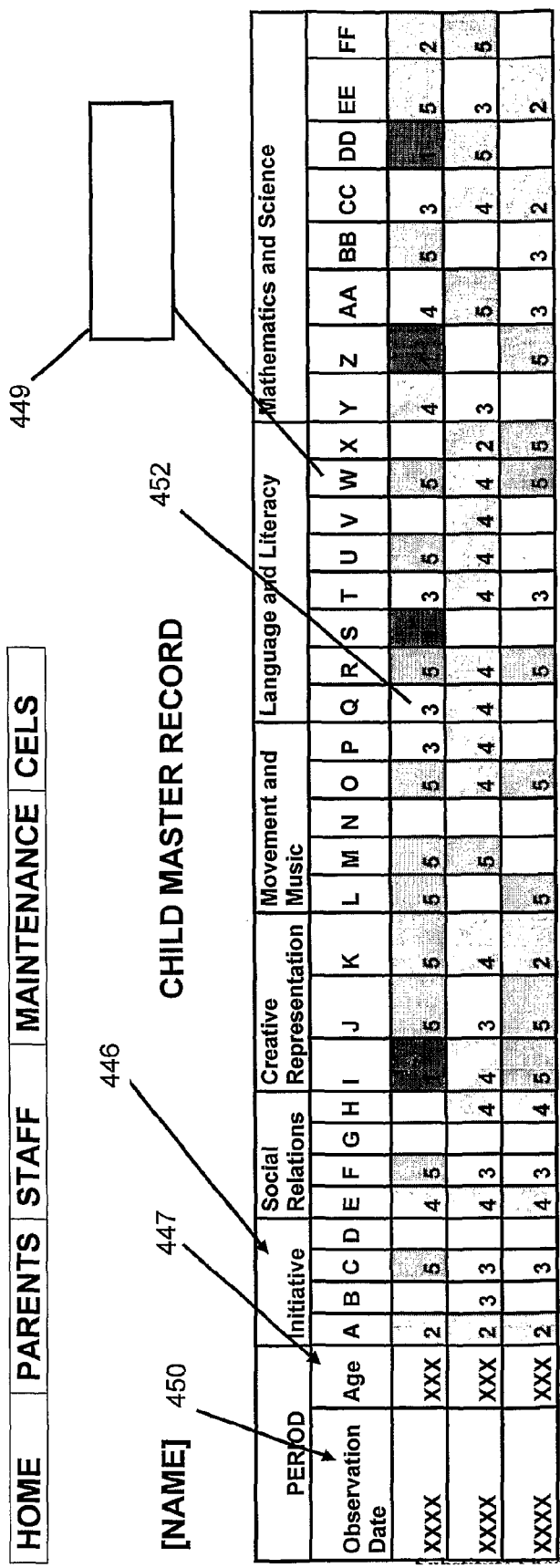
FIG. 37 is a child master record generated by querying the databases and representing scores of a particular child with respect to learning areas and timestamps.

In FIG. 37, there is shown another development table generated by the server 12 executing an appropriate database query. The layout of the table is similar, as indicated by the reference numbers. However, this table is specific to a particular child with the first column 450 being populated with incremental time stamps.

Each of the resultant cells 452 represents a score given to a child at a particular point in time with respect to a particular learning component. Thus, since the scores are associated with respective colours, it will be possible readily to perceive a visual indication of a child's progress or otherwise in respect of certain learning components. Furthermore, the table will also indicate where no scores have been entered. The table could thus be a tool for monitoring the activities of teachers or carers. The table of FIG. 37 is generated such that each cell, when scored, defines a link to the particular observation associated with the score. Viewing observations is described below.

In one embodiment, the server 12 is configured so that each cell defines a link to either of the observation entry menus shown in FIGS. 27 and 33. Thus, by selecting a particular cell, it is possible for a user to carry out the various steps indicated in, for example, FIG. 33. Thus, the observation generated when the cell is selected; is shown on the observation page described with reference to FIG. 34. It follows that a user can make adjustments to the program plan by using the activity shown at 568 to access the programming menu shown in FIG. 22.

Figure 38:
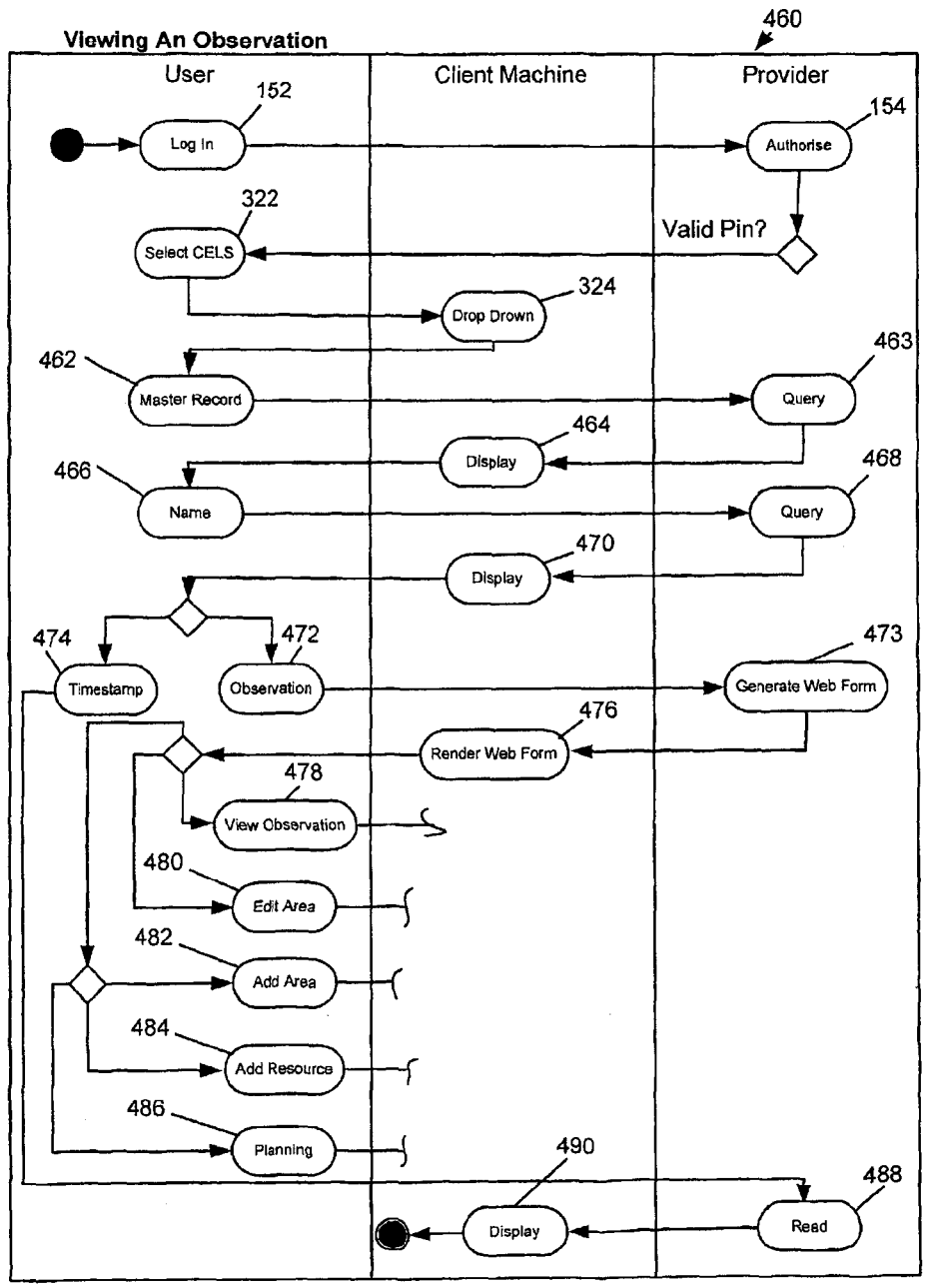
FIG. 38 is an activity diagram for viewing observations made by a carer using the records shown in FIGS. 35 and 37

In FIG. 38, reference numeral 460 generally indicates an activity diagram showing the steps associated with viewing an observation. With reference to the previous drawings, like reference numerals refer to like components, unless otherwise specified.

In this example, the user selects a master record menu at 462. A page request is sent to the server 12. The server 12 then queries the database described in FIGS. 8 to 10 and generates the table shown in FIG. 32, which will be referred to as a master record, which is rendered on the client machine at 464.

The server 12 is configured so that the children listed in the master record are links to child master records, such as the one shown in FIG. 33. Thus, a user can select a child at 486. A request is then sent to the server 12 which performs a query on the databases described in FIGS. 8 to 10 at 468 and generates the table shown in FIG. 33, which will be referred to as a child master record, and which is rendered on the client machine at 470.

The user can then elect to view an observation at 472 or a timestamp at 474.

If the user selects the observation, a page request is sent to the server 12 which generates a web form at 473 that is rendered on the client machine at 476. The web form is similar to that shown in FIGS. 23 and 24. That form allows the user to perform a number of different actions including viewing the observation at 478, editing a learning area at 480, adding a learning area at 482, adding a resource at 484 or performing planning at 486. These activities have all been described above. In particular, as described above, the various activities can be carried out substantially simultaneously, for example, by a staff member in a room while that staff member is viewing children's behaviour.

If the user selects a timestamp, the server 12 reads the observation from the database at 488 and the observation is rendered for viewing on the client machine at 490. The server 12 can be configured to render the observation page associated with observation entries as described above.

Figure 39:
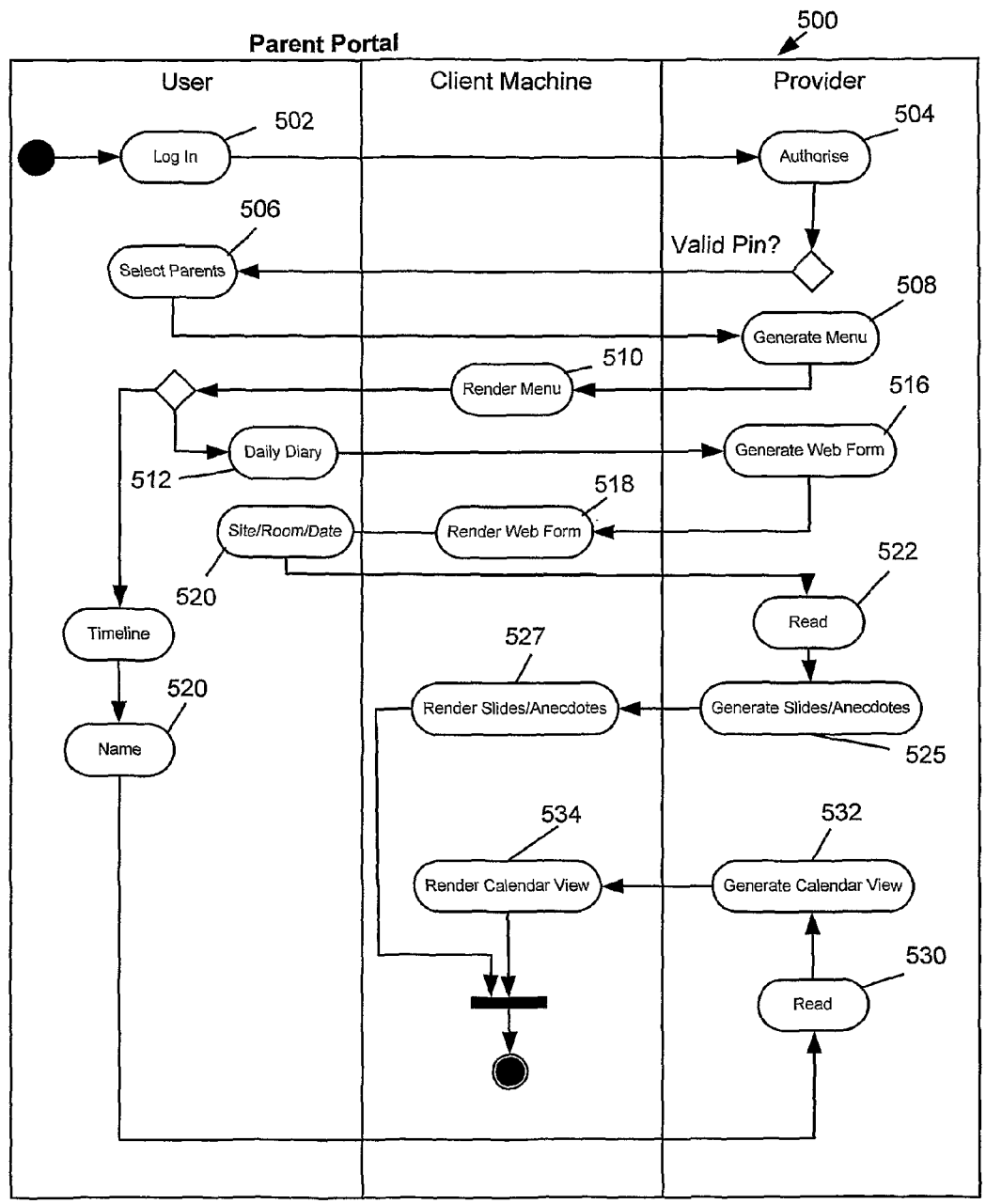
FIG. 39 is an activity diagram used for generating a parent portal to permit parents to view a daily diary or a timeline associated with a child.
Figure 40:
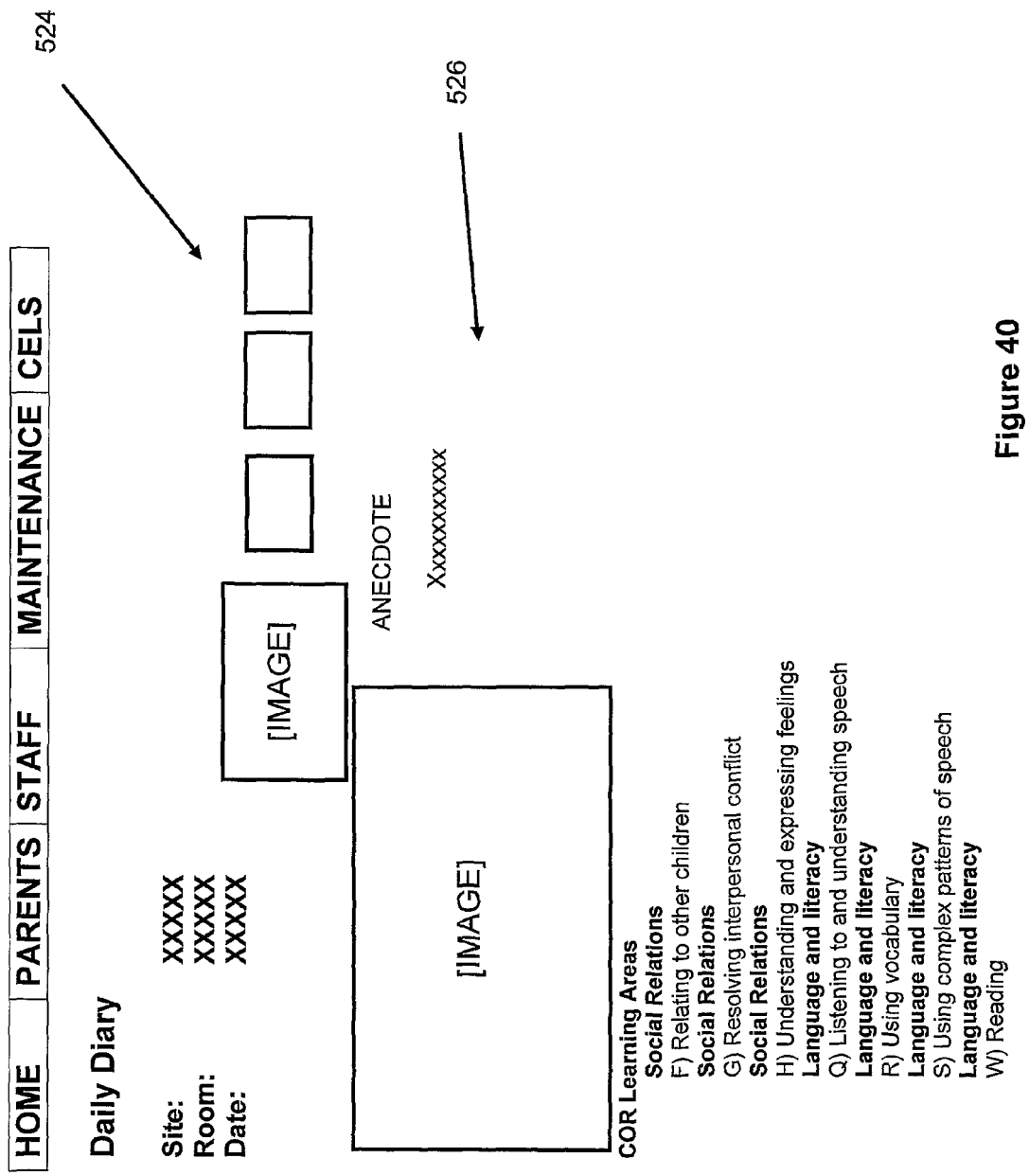
FIG. 40 is a screen dump of part of a daily diary generated by the system of FIG. 1.
Figure 41:
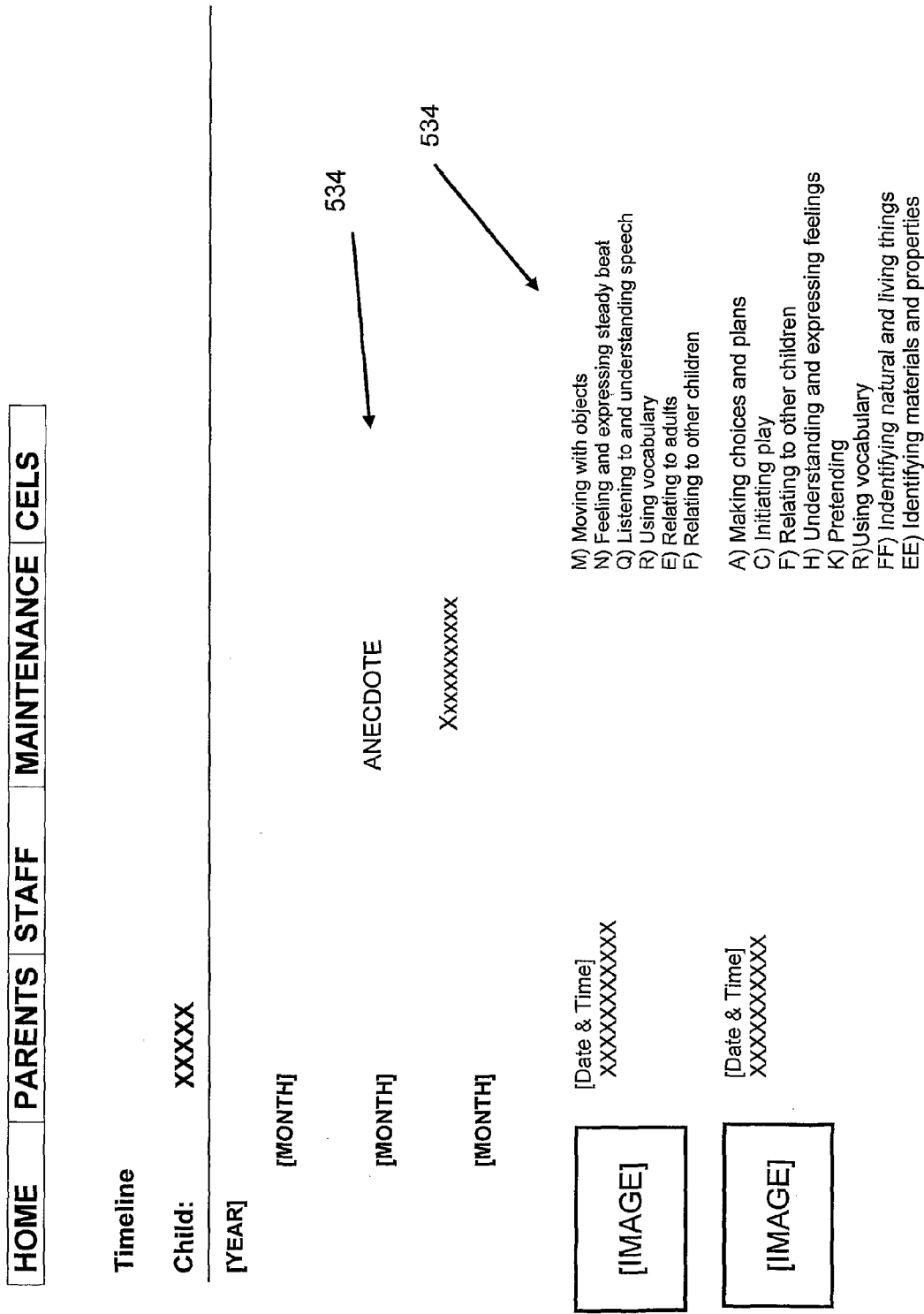
FIG. 41 is a screen dump of a calendar generated by the system of FIG. 1.

In FIG. 39, reference numeral 500 generally indicates en activity diagram for the use of a parent portal of the system 10.

In this example, the server 12 is configured so that a parent is permitted limited access to some of the information stored in the database. This would include a daily diary or a calendar view. The parent performs a login action at 502. At 504 the server performs an authorisation and allows access if the login details are valid. The parent selects the parents menu at 506. A page request is sent to the server 12 which generates a menu at 508 that is rendered on the client machine at 510. The menu allows the parent to select between viewing a daily diary at 512 and a timeline at 514.

If a parent selects the daily diary, a page request is sent to the server 12 which generates a web form at 516 that is rendered on the client machine at 518. The web form allows the parent to select a site, a room and a date at 520. A page request is then sent to the server 12 which reads or queries the tables in FIG. 10 at 522 and generates a page with a slideshow of the uploaded images, as described above, together with anecdotes that may have been entered by a teacher or carer at 525. That page is rendered on the client machine at 527. An example of such a page is shown in FIG. 38. In particular, the slideshow is shown at 524, the anecdote at 526.

If the parent selects, the timeline, the parent can select the child's name at 528. A page request is sent to the server 12 which reads the tables in FIG. 10 at 530 and generates a calendar view at 532. The calendar view is rendered on the client machine at 534. An example of the calendar view is shown in FIG. 37. The calendar view has date areas 534. When observations have been made on the day with respect to the child in question, the relevant image, anecdote and learning areas are displayed in the associated date area.

It will readily be appreciated that any number of other queries can be generated by the server 12 to extract useful information from the databases described earlier. For example, queries could be generated for viewing anecdotes and images associated with a particular teacher or carer. This would provide an indication of the activities carried out by the teacher or carer for assessment purposes.

The server 12 may be configured so that a search engine is generated with a data entry field on the web pages. The search engine may be configured so that, on receipt of search strings entered by a user, the server 12 can run the appropriate queries on the databases described earlier.

The observations menu allows a user to create output either for groups of children or individual children. The manner in which the observations are recorded facilitate the development of the slideshow referred to above. The observations can be recorded together with photographic and anecdotal evidence such that learning outcomes of activities for groups or individual children can be assessed.

The observations menu allows a user to create program plans to scaffold learning for a particular learning indicator for groups or individual children. The master record and the child master record allow automatic updating of information. Furthermore, the observations menu allows for the structure of an E-portfolio of observations that can be accessed at any location and at any time. This allows remote overview of development.

The programming menu allows the creation of plans for groups or individuals together with the ability to evaluate progress, develop follow up plans, enter reflections by a teacher in connection with the program plan and, at any time, view, edit, print or delete programs. It is also possible to open the programming menu while recording observations and to create a program to facilitate the scaffolding of the learning process. Furthermore, the programming menu can be opened in the child master record and program plan can be, created if necessary.

As far as the master record and child master record are concerned, it will be appreciated that such records are a colour-coded report. For example, a white colour code would highlight at a glance learning areas and statements that have not been programmed or observed for the group or individual child. A grey colour code on the report shows recorded observations that have not been assigned a score in respect of the associated learning components. The colour-coded scores, for example, from orange to green as described above, can highlight that an additional group or individual program plan may be needed.

The invention provides a manner in which observations can be recorded in real-time. This facilitates accuracy and also ensures that the associated staff member is properly utilised. For example, when the children are performing various tasks, the staff member can use his or her client machine, for example, a notebook computer that is connected to the server 12 to enter observation data, to make comments, to score certain learning components and to create or modify existing development programmes based on observing the children in real-time.

Throughout the specification, including the claims, where the context permits, the term "comprising" and variants thereof such as "comprise" or "comprises" are to be interpreted as including the stated integer or integers without necessarily excluding any other integers.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

The invention claimed is:

1. A development monitoring system for monitoring the development of subjects by a user, the system comprising a server that is configured to communicate with a client device over a data communication network, wherein the server is configured to carry out at least the following steps:

generating a web form configured for rendering on the client device and suitable for the input of data by the user, the server being configured so that:

the web form displays to the user a plurality of learning components related to development of the subjects and facilitates selection of a learning component from the plurality of learning components by the user;

the web form displays scoring fields configured to allow the user to, for each of the subjects or a group of subjects, select a score to be associated with the selected learning component;

the web form is configured to allow the user to add an anecdote in connection with an observed behaviour related to the development of the subject or the group of subjects; and the web form is configured to allow the user to upload onto the web form at least one image of the observed behaviour and the score associated with the selected learning component;

associating the data input using the web form with a timestamp;

writing the data input to a database; and reading the data from the database and generating a display configured for rendering on the client device, the display showing one or more of the at least one image, the selected learning component, the anecdote, and an automatically generated arrangement of cells, wherein each cell:

is populated by the score associated with the corresponding learning component and the corresponding subject or group subjects;

displays a color determined by the server, wherein color changes across the plurality of cells enable a viewer to perceive one or more development trends or traits in the plurality of scores over time; and includes a link to a particular observation associated with the score, wherein the server is configured to read the data from the database when the cell is selected and to generate a display configured for rendering on the client device, the display showing the at least one image and/or the anecdote associated with the particular observation.

2. The development monitoring system as claimed in claim 1, wherein the display is configured for rendering the automatically generated arrangement of cells as an automatically generated development table comprising a plurality of rows and a plurality of columns orthogonal to and intersecting the plurality of rows, each intersection of any row and any column defining one of the cells.

3. A method of monitoring the development of subjects, the method comprising the steps of generating, with a server, a web form;

providing the web form to a client device such that:

the web form displays to a user a plurality of learning components relating to development of subjects and facilitates selection of a learning component from the plurality of learning components by the user;

the web form displays scoring fields configured to allow the user to, for each of the subjects or a group of subjects, select a score to be associated with the selected learning component;

the web form is configured to allow the user to add an anecdote in connection with an observed behaviour related to the development of the subjects; and the web form is configured to allow the user to upload onto the web form at least one image of the observed behaviour and the score associated with the selected learning component;

writing data input by the user using the web form to a database in association with a timestamp;

reading the data from the database; and generating a display configured for rendering on the client device, the display showing one or more of the at least one image, the selected learning component, the anecdote, and an automatically generated arrangement of cells, wherein each cell;

is populated by the score associated with the corresponding learning component and the corresponding subject or group of subjects;

displays a color determined by the server, wherein color changes across the plurality of cells enable a viewer to perceive one or more development trends or traits in the plurality of scores over time; and includes a link to a particular observation associated with the score, wherein the server is configured to read the data from the database when the cell is selected and to generate a display configured for rendering on the client device, the display showing the at least one image and/or the anecdote, associated with the particular observation.

4. The method as claimed in claim 3, including automatically generating an alert indicating a predetermined development trend or trait in the plurality of user-entered scores over a predetermined time period or over a predetermined number of the learning components.

5. The method as claimed in claim 3, wherein the display is configured for rendering the automatically generated arrangement of cells as an automatically generated development table comprising a plurality of rows and a plurality of columns orthogonal to and intersecting the plurality of rows, each intersection of any row and any column defining one of the cells.

6. A non-transitory computer readable medium capable of execution by a data processing machine and containing instructions which, when executed by the data processing machine, causes the data processing machine to carry out the following steps:

generating a web form;

providing the web form to a client device such that:

the web form displays to a user a plurality of learning components relating to development of subject(s) and facilitates selection of a learning component from the plurality of learning components by the user;

the web form displays scoring fields configured to allow the user to, for each of the subjects or a group of subjects, select a score to be associated with the selected learning component;

the web form is configured to allow the user to add an anecdote in connection with an observed behaviour related to the development of the subject(s); and the web form is configured to allow the user to upload onto the web form at least one image of the observed behaviour and the score associated with the selected learning component;

writing data input by the user using the web form to a database in association with a timestamp;

reading the data from the database; and generating a display, configured for rendering on the client device, the display showing one or more of the at least one image, the selected learning component, the anecdote, and an automatically generated arrangement of cells, wherein each cell:

is populated by the score associated with the corresponding learning component and the corresponding subject or group of subjects;

displays a color determined by the server, wherein color changes across the plurality of cells enable a viewer to perceive one or more development trends or traits in the plurality of scores over time; and includes a link to a particular observation associated with the score, wherein the server is configured to read the data from the database when the cell is selected and to generate a display configured for rendering on the client device, the display showing the at least one image and/or the anecdote associate with the particular observation.

7. The non-transitory computer readable medium as claimed in claim 6, wherein the display is configured for rendering the automatically generated arrangement of cells as an automatically generated development table comprising a plurality of rows and a plurality of columns orthogonal to and intersecting the plurality of rows, each intersection of any row and any column defining one of the cells.

* * * * *